US009565299B2

(12) United States Patent
Shim

(10) Patent No.: US 9,565,299 B2
(45) Date of Patent: Feb. 7, 2017

(54) METHOD FOR MANAGING EMAIL MESSAGE OF CALL APPLICATION, USER DEVICE USING THE SAME, AND NON-VOLATILE MEDIUM RECORDING THEREON PROGRAM FOR EXECUTING THE METHOD

(71) Applicant: Samsung Electronics Co., Ltd., Gyeonggi-do (KR)

(72) Inventor: Minsik Shim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 34 days.

(21) Appl. No.: 14/583,396

(22) Filed: Dec. 26, 2014

(65) Prior Publication Data

US 2015/0195401 A1 Jul. 9, 2015

(30) Foreign Application Priority Data

Jan. 3, 2014 (KR) ........................ 10-2014-0000917

(51) Int. Cl.
*H04W 4/00* (2009.01)
*H04M 3/42* (2006.01)
*H04M 1/2745* (2006.01)
*H04M 1/725* (2006.01)
*H04L 29/12* (2006.01)

(52) U.S. Cl.
CPC ........ *H04M 3/42068* (2013.01); *H04L 61/307* (2013.01); *H04M 1/274516* (2013.01); *H04M 1/72552* (2013.01); *H04L 61/605* (2013.01)

(58) Field of Classification Search
USPC ............... 455/412.1–414.1, 414.4–417, 466
See application file for complete search history.

(56) References Cited

U.S. PATENT DOCUMENTS

| 8,606,576 | B1* | 12/2013 | Barr | G10L 15/22 379/88.01 |
|---|---|---|---|---|
| 2009/0036105 | A1* | 2/2009 | Carion | H04L 67/10 455/414.1 |
| 2010/0039495 | A1 | 2/2010 | Rahman et al. | |
| 2010/0057856 | A1* | 3/2010 | O'Sullivan | G06Q 10/107 709/206 |
| 2010/0262928 | A1* | 10/2010 | Abbott | G06F 3/04817 715/769 |
| 2011/0050601 | A1* | 3/2011 | Son | G06F 3/04883 345/173 |
| 2011/0161315 | A1* | 6/2011 | Bonnet | G06F 17/2705 707/723 |
| 2011/0210907 | A1* | 9/2011 | Martin-Cocher | G06F 17/30905 345/1.3 |
| 2014/0025847 | A1* | 1/2014 | Choi | H04L 67/06 710/33 |

(Continued)

*Primary Examiner* — Dai A Phuong
(74) *Attorney, Agent, or Firm* — Cha & Reiter, LLC

(57) ABSTRACT

Various methods and user devices for managing an email message through a call application. An email application installed in the user device extracts a phone number and/or body content of the email message from the email message, and then delivers the extracted phone number and/or body content to a call application installed in the user device. Then the call application stores and/or displays, in a memory and/or on a display unit, the phone number and/or body content of the email message.

16 Claims, 21 Drawing Sheets

(56) References Cited

U.S. PATENT DOCUMENTS

| | | | |
|---|---|---|---|
| 2014/0184486 A1* | 7/2014 | Jung | G06F 3/005 |
| | | | 345/156 |
| 2014/0344749 A1* | 11/2014 | Choi | H04M 1/72583 |
| | | | 715/780 |
| 2016/0147392 A1* | 5/2016 | Choi | G06F 9/4843 |
| | | | 715/716 |

\* cited by examiner

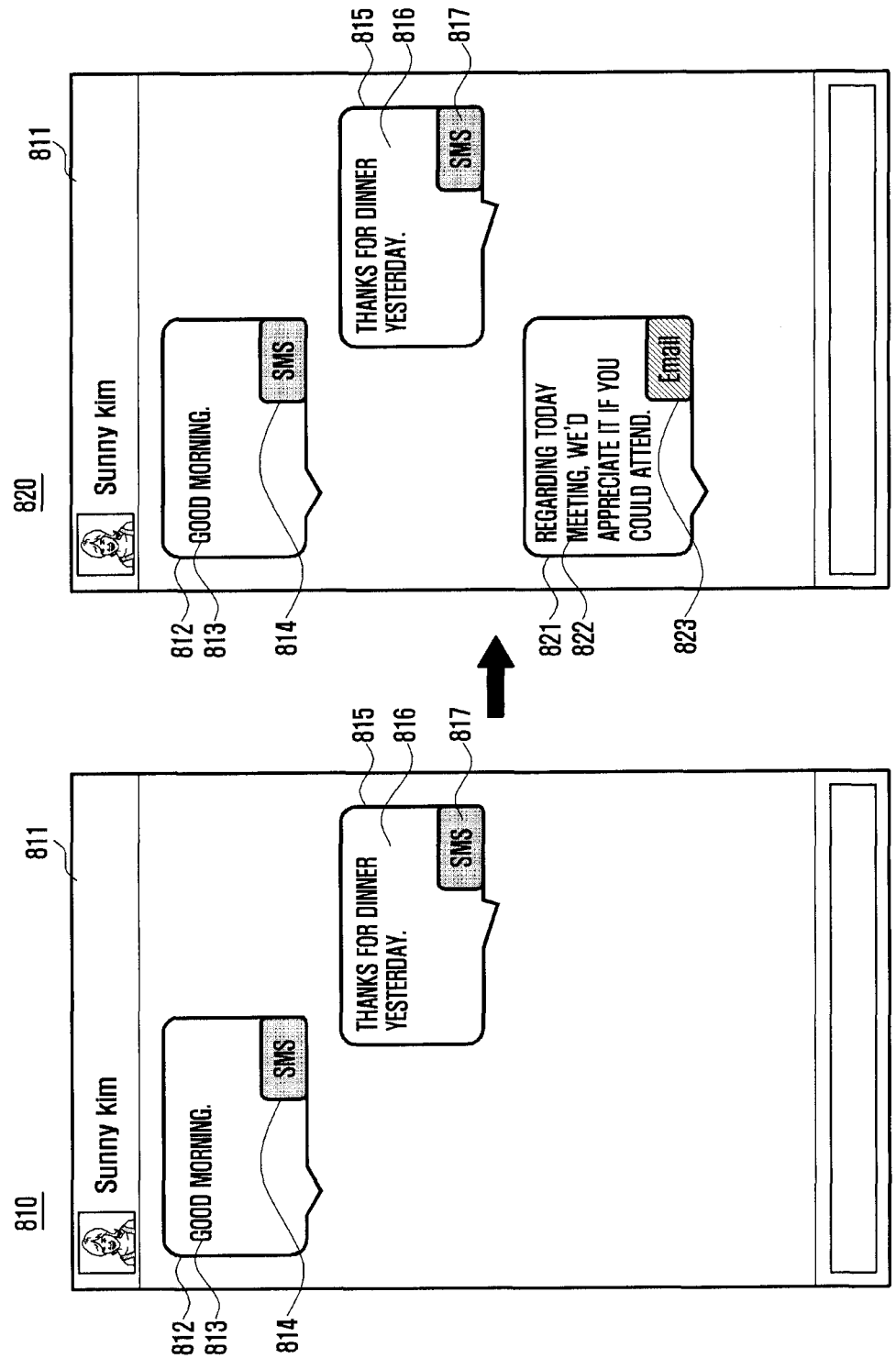

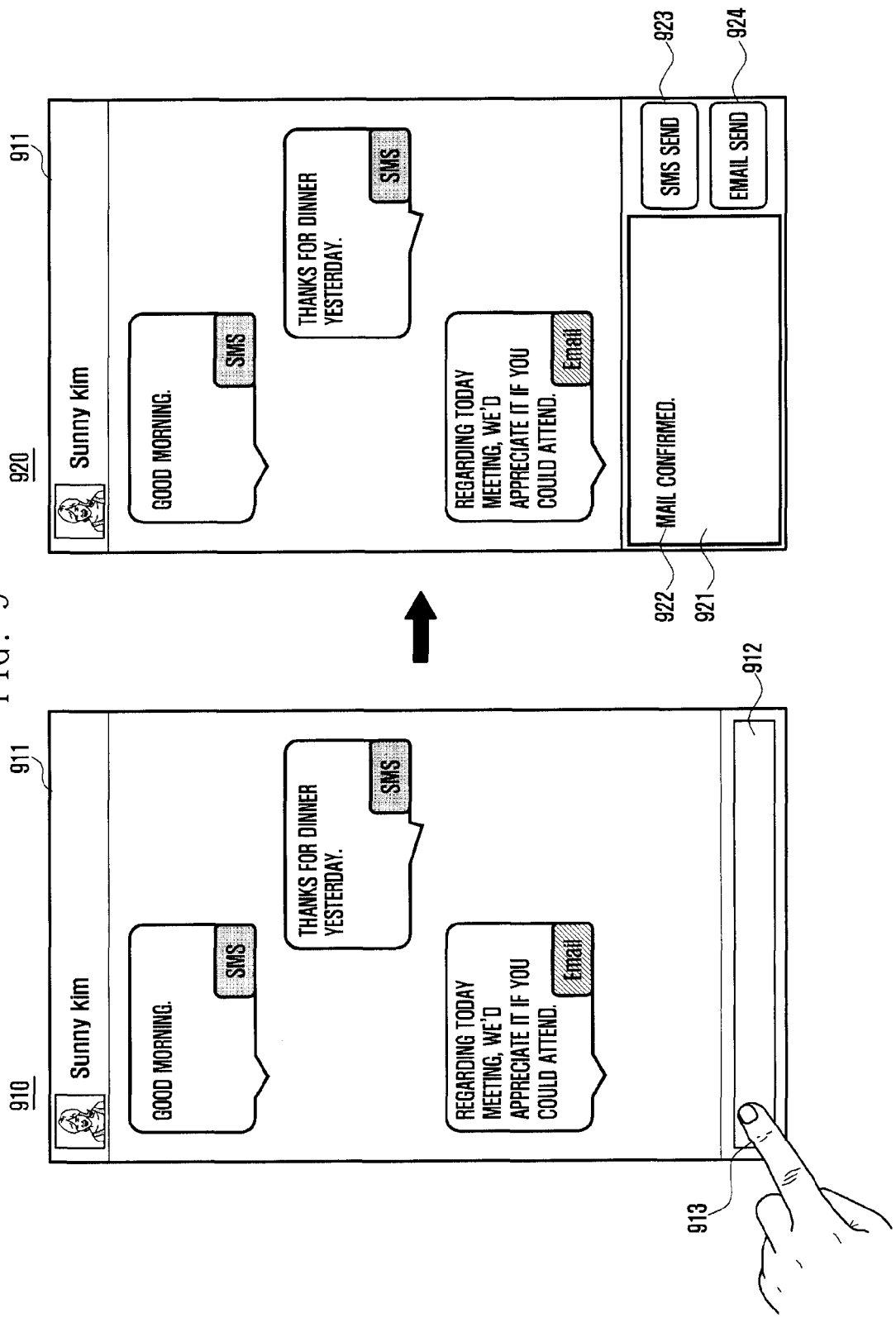

FIG. 10
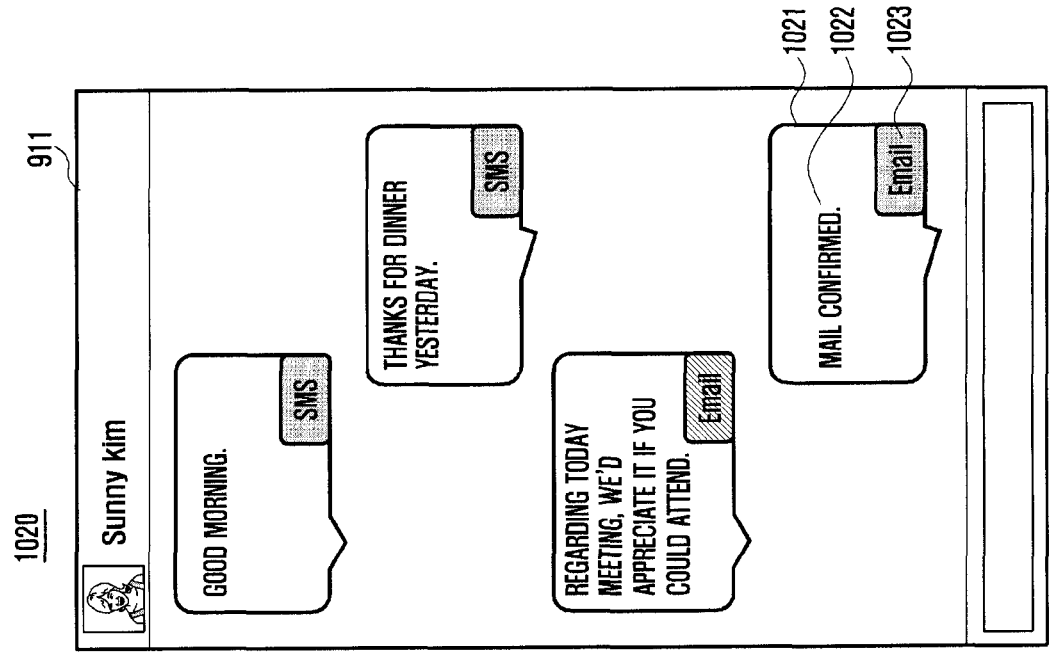
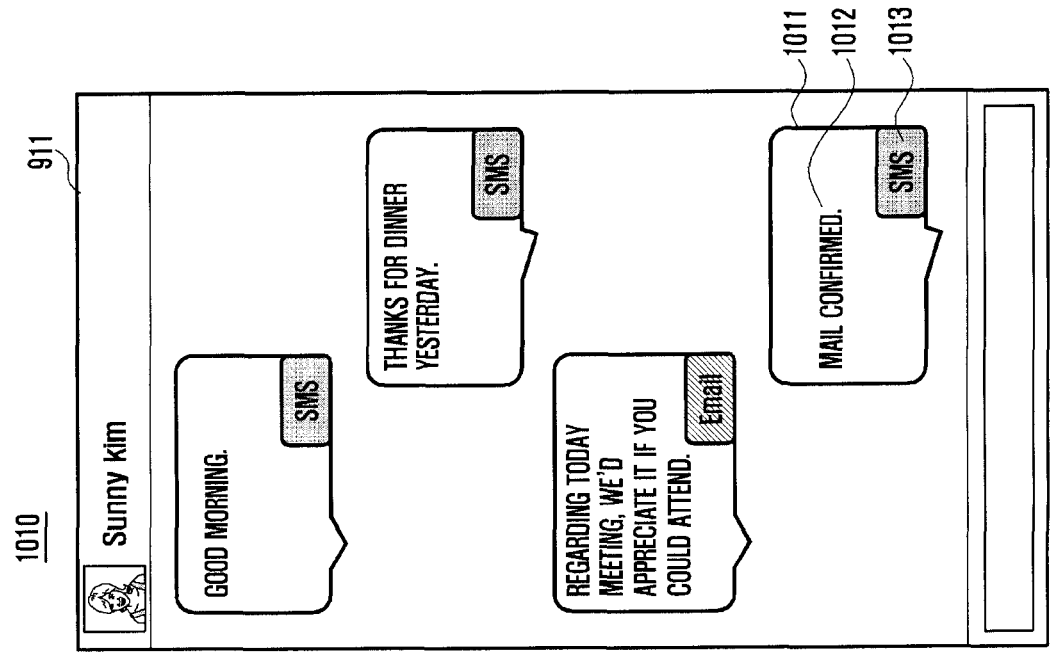

METHOD FOR MANAGING EMAIL MESSAGE OF CALL APPLICATION, USER DEVICE USING THE SAME, AND NON-VOLATILE MEDIUM RECORDING THEREON PROGRAM FOR EXECUTING THE METHOD

CLAIM OF PRIORITY

This application claims the benefit under 35 U.S.C. §119(a) from a Korean patent application filed on Jan. 3, 2014 in the Korean Intellectual Property Office and assigned Serial No. 10-2014-0000917, the entire disclosure of which is hereby incorporated by reference in its entirety.

BACKGROUND

Field of the Disclosure

The present disclosure relates to a method and device for offering an email message in a call application which identifies sending device by means of a phone number when the email message is received or sent. Particularly, the present disclosure relates to a method and device for offering an email message through interworking between a call application and an email application.

Description of the Related Art

There are call applications that use a phone number to identify a caller or someone sending a text message, and email applications that use an email address to identify the sender of the email. A text message application and a call log application are two examples of the more general category of a call application. The text message application receives a text message from a sending device identified by a phone number, or sends a text message entered by a user to receiving device via a base station. As such a text message, a Short Message Service (SMS) is a message having a limitation in a quantity of characters contained in the message, a Long Message Service (LMS) is a message having substantially no limitation regarding the quantity of characters contained in the message, a Multimedia Message Service (MMS) is a message with an attached file, and the like are currently in wide use due to the proliferation of wireless devices not limited to mobile electronic devices.

For an example of various operations, the call log application stores, manages and displays a received/sent call log, a received/sent text message log, and a missed call log.

The email application receives an email message from a sender typically identified via an email address, or the email application sends an email message entered by a user to a recipient via a mail server.

In the case of using the call application and the email application together, a user often experiences the inconvenience of having to separately manage a text message and an email message by each respective application. This inconvenience is caused by a difference in a manner of identifying a sender. Namely, the call application such as the text message application or the call log application identifies a sender by the phone number of the sender's device, whereas the email application identifies a sender by an email address.

While the text message application or the call log application is an inherent function of a traditional mobile phone, the email application which is a traditionally function of a personal computer, and thus email is a recently added function of an advanced mobile phone such as a smart phone. In addition, users tend to use an email message less frequently than a voice call or a text message. Additionally, due to a lot of spam email, a user often has some difficulty in sorting a personal email message, and valid messages are sometimes inadvertently sent to a spam folder by screening programs. For such reasons, a sender tends to use the call log application or the text message application more frequently than the email application.

Considering recent changes in wireless infrastructure allowing easier use of data or WiFi, and the ever-increasing popularization of smart phones, new techniques to improve accessibility of email applications that permit both the comprehensive management of text messages and an email messages is required.

SUMMARY

Accordingly, embodiments of the present disclosure provide a method and device for overcoming the above drawbacks in a novel and non-obvious manner.

According to one embodiment of the present disclosure, a method for managing an email message in a user device using a call application that identifies a sender device by a phone number may comprise the operations of: acquiring the email message from an external device; extracting the phone number from the received email message; at the call application installed in the user device, acquiring the extracted phone number and an associated source identifier indicating that the phone number is extracted from the email message; and storing the received phone number and the associated source identifier in storage in a predefined type of category.

According to another embodiment of the present disclosure, a method for managing an email message in a user device using a call application that identifies a sender device by a phone number may comprise acquiring the email message from an external device; extracting the phone number and body content of the email message from the received email message; and displaying the body content of the email message in a message window which corresponds to the phone number and is offered by a text message application installed in the user device.

According to still another embodiment of the present disclosure, a method for managing an email message in a user device using a call application that identifies a sender device by a phone number may comprise acquiring the email message from an external device; extracting the phone number from the received email message; at a call log application installed in the user device, acquiring the extracted phone number and a generated source identifier associated with the extracted phone number that indicates that the phone number is extracted from the email message; and displaying the received phone number and a source icon associated with the source identifier in a log list provided (offered) by the call log application.

According to yet another embodiment of the present disclosure, a user device for managing an email message through a call application that identifies a sender device by a phone number may comprise a non-transitory memory configured to store therein an email application and the call application; and a control unit configured to control the email application to receive the email message from an external device, to control the call application to receive the phone number extracted from the email message and a generated a source identifier associated with the extracted phone number indicating that the phone number is extracted from the email message, and to control the memory to store therein the received phone number and the associated source identifier in a predefined type.

According to further another embodiment of the present disclosure, a user device for managing an email message through a call application that identifies a sender device by a phone number may comprise a display unit; a non-transitory memory configured to store therein an email application and a text message application; and a control unit configured to control the email application to receive the email message from an external device, to control the text message application to receive the phone number contained in the email message and to receive body content of the email message, and to control the display unit to display the body content of the email message in a message window which corresponds to the phone number and is offered by the text message application.

According to still further another embodiment of the present disclosure, a user device for managing an email message through a call application that identifies a sender device by a phone number may comprise a display unit; a memory configured to store therein an email application and a call log application; and a control unit configured to control the email application to receive the email message from an external device, to control the call log application to receive the phone number extracted from the email message and a generated source identifier associated with the extracted phone number indicating that the phone number is extracted from the email message, and to control the display unit to display the received phone number and a source icon associated with the source identifier in a log list offered by the call log application.

According to yet further another embodiment of the present disclosure, a non-transitory computer-readable medium may record thereon a executable code when loaded into hardware such as a processor, microprocessor or controller for managing an email message through a call application which is installed in a user device and identifies a sender device by a phone number, the program configured to define control commands for acquiring the email message from an external device; extracting a phone number from the received email message; at the call application, acquiring the extracted phone number and a source identifier associated with the extracted phone number indicating that the phone number is extracted from the email message; and storing the received phone number and the associated source identifier in a predefined type.

According to yet further another embodiment of the present disclosure, a non-transitory computer-readable medium may record thereon a executable code when loaded into hardware such as a processor, microprocessor or controller for managing an email message through a call application which is installed in a user device and identifies a sender device by a phone number, the program configured to define control commands for acquiring the email message from an external device; extracting the phone number and body content of the email message from the received email message; and displaying the body content of the email message in a message window which corresponds to the phone number and is offered by a text message application installed in the user device.

BRIEF DESCRIPTION OF THE DRAWINGS

The above and other aspects, features and advantages of embodiments of the present disclosure will become more apparent to a person of ordinary skill from the following description taken in conjunction with the accompanying drawings, in which:

FIG. 8A and FIG. 8B are screenshots illustrating a process of displaying an email message in a text message application in accordance with an embodiment of the present disclosure;

FIG. 9 and FIG. 10 are screenshots illustrating a process of displaying an email message in a text message application in accordance with another embodiment of the present disclosure;

DETAILED DESCRIPTION

The following description with reference to the accompanying drawings is provided to assist a person of ordinary skill in the art with a comprehensive understanding of various embodiments of the present disclosure as defined by the claims and their equivalents. The detailed description includes various specific details to assist in that understanding but these are to be regarded as merely exemplary. Accordingly, those of ordinary skill in the art will recognize that various changes and modifications of the embodiments described herein may be made without departing from the scope and spirit of the present disclosure. In addition, descriptions of well-known functions and constructions may be omitted for clarity and conciseness when their inclusion would obscure appreciation of the disclosure by a person of ordinary skill in the art.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustrative purposes only and not for the purpose of limiting the present disclosure as defined by the appended claims and their equivalents.

As used herein, the singular forms "a", "an", and "the" are intended to include the plural forms, including "at least one of" or "one or more of", unless the content clearly indicates otherwise. "Or" means "and/or". As used herein, the term "and/or" includes any and all combinations of one or more of the associated listed items. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
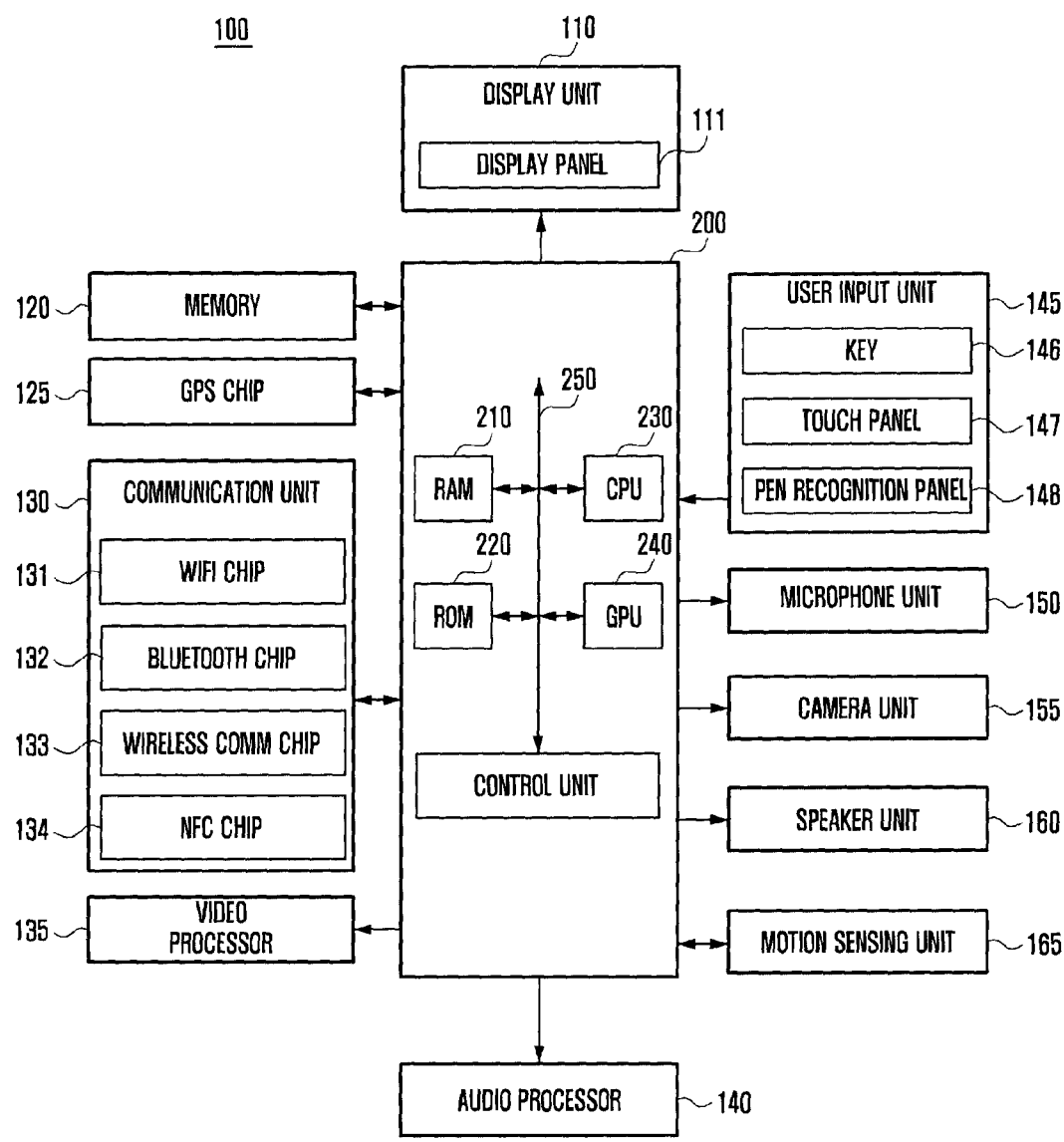
FIG. 1 is a block diagram illustrating a user device in accordance with an embodiment of the present disclosure.

FIG. 1 is a block diagram illustrating a user device in accordance with an embodiment of the present disclosure.

The user device 100 shown in FIG. 1 may be applied to, for example, a great variety of electronic devices such as a smart phone, a tablet Personal Computer (PC), a mobile phone, a video phone, an e-book reader, a desktop PC, a laptop PC, a notebook computer, a Personal Digital Assistant (PDA), a Portable Multimedia Player (PMP), an MP3 player, a portable medical device, a digital camera, a wearable device (e.g., an Head-Mounted Device (HMD) or a wrist watch), a TV, a DVD (Digital Video Disk) player, audio equipment, a refrigerator, an air conditioner, a vacuum cleaner, an oven, a microwave, a washing machine, an air cleaner, a set-top box, a game console, an electronic dictionary, an electronic key, a camcorder, or a medical device (e.g., Magnetic Resonance Angiography (MRA), Magnetic Resonance Imaging (MRI), Computed Tomography (CT), ultrasonography, etc.), just to name a few of the non-limiting possible devices.

According to some embodiments, the user device 100 may be also referred to as a portable device, a mobile device, a user terminal, an electronic device, or the like as well understood by those skilled in the art.

Referring to FIG. 1, the user device 100 may include, but not be limited to, a display unit 110, a control unit 200, a non-transitory memory 120, a GPS (Global Positioning System) chip 125, a communication unit 130, a video processor 135, an audio processor 140, a user input unit 145, a microphone unit 150, a camera unit 155, a speaker unit 160, and a motion sensing unit 165.

The display unit 110 may include a display panel 111 and a display controller (not shown) comprised of integrated circuitry and/or programmable hardware for controlling the display panel 111. The display panel 111 may be formed of various types of display such as a Liquid Crystal Display (LCD), an Organic Light Emitting Diode (OLED), an Active Matrix OLED (AM-OLED), a Plasma Display Panel (PDP), or the like. The display panel 111 may be embodied to be, for example, flexible, transparent, or wearable. The display unit 110 may be offered in the form of a touch screen (not shown) by combining with a touch panel 147 of the user input unit 145. For example, the touch screen may include a single module in which the display panel 111 and the touch panel 147 form a stack structure.

The non-transitory memory 120 may include an internal memory and an external memory. The internal memory may be a volatile memory (e.g., DRAM (Dynamic RAM), SRAM (Static RAM), SDRAM (Synchronous DRAM), etc.). For example, an application may be loaded onto the first memory of the memory 120 and then executed. When the supply of electric power is stopped, information may disappear from this volatile memory. The internal memory may be a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.). The external memory may further include a flash driver, for example, a Compact Flash (CF), a Secure Digital (SD), a Micro Secure Digital (Micro-SD), a Mini Secure Digital (Mini-SD), an eXtreme Digital (xD), or a MemoryStick.

According to an embodiment, the control unit 200, which includes integrated circuitry such as a processor or microprocessor, may load commands or data that are received from the non-volatile memory or any other element, in the volatile memory and process them. Additionally, the control unit 200 may store data that is created or received from other elements, in the non-volatile memory.

The memory 120 may store therein various programs and data required for the operation of the user device 100. Specifically, the memory 120 may store a text message, an email message, a phonebook in which at least one phone number of each device in communication with the user device 100 is mapped, as a source identifier, or the like.

The control unit 200 may display a text message, an email message, or the like on the display unit 110, using the programs and data stored in the memory 120. Also, in response to a user gesture made on a certain region of the display unit 110, the control unit 200 may perform a control operation corresponding to the user gesture.

The control unit 200 may include a RAM 210, a ROM 220, a CPU 230, a GPU (Graphic Processing Unit) 240, and a bus 250. The RAM 210, the ROM 220, the CPU 230, and the GPU 240 may be connected with each other through the bus 250.

The CPU 230 accesses the memory 120 and performs a booting procedure using O/S (Operating System) stored in the memory 120. Then the CPU 230 performs various operations using various executable code, contents, data, or the like stored in the memory 120.

The ROM 220 stores a set of commands for a system booting. For example, when a turn-on command is entered and thereby electric power is supplied, the CPU 230 copies the O/S stored in the memory 120 onto the RAM 210 according to a command stored in the ROM 220 and then boots the system by executing the O/S. When the booting is completed, the CPU 230 copies selected executable code stored in the memory 120 onto the RAM 210 and then performs a corresponding operation by executing the code. When the booting of the user device 100 is completed, the GPU 240 controls an activated region, from among a main region and a sub region, to display a User Interface screen. Specifically, using a calculating part (not shown) and a rendering part (not shown), the GPU 240 may create a screen that contains therein various objects such as icons, images, text, and the like. Based on the layout of a screen, the calculating part calculates attribute values of the objects to be displayed, such as coordinate values, shapes, sizes, and colors. Based on the attribute values, the rendering part creates a screen containing objects and having a specific layout selected from various layouts. This screen is provided to the display unit 110 and displayed on a selected region of the display unit 110.

The GPS chip 125 is an integrated circuit configured to receive GPS signals from GPS satellites and to calculate a current position of the user device 100 based on the received GPS signals. When a navigation program is used, or in case a user's current location is needed, the control unit 200 may receive a user's location by using the GPS chip 125.

The communication unit 130 is configured to perform a communication with various kinds of external devices, depending on various communication types. The communication unit 130 includes, but not limited to, a Wireless Fidelity (WiFi) chip 131, a Bluetooth chip 132, a wireless communication chip 133, and a Near Field Communication (NFC) chip 134. Using the communication unit 130, the control unit 200 performs a communication with various external devices.

The WiFi chip 131 and the Bluetooth chip 132 include integrated circuitry configured to perform a communication based on WiFi technique and Bluetooth technique, respectively. In case of using the WiFi chip 131 or the Bluetooth chip 132, the communication unit 130 may first transmit and receive various kinds of connectivity information such as SSID and a session key to and from an external device, then connect with the external device on the basis of the connectivity information, and then transmit and receive various types of information to and from the external device. The wireless communication chip 133 performs a communication based on various communication standards such as IEEE standards, Zigbee, 3rd Generation) (3G), a 3rd Generation Partnership Project (3GPP) ( ), Long Term Evolution (LTE), and the like. The NFC chip 134 operates based on NFC technique using 13.56 MHz from among various RF-ID frequency bands such as 135 kHz, 13.56 MHz, 433 MHz, 860~960 MHz, 2.45 GHz, and the like.

The video processor 135 comprises hardware such as integrated circuitry that is configured to process video data contained in contents received through the communication unit 130 or stored in the memory 120. The video processor 135 may perform various types of image processing for video data such as decoding, scaling, noise filtering, frame rate conversion, resolution conversion, and the like. The video processor 135 may be coupled with the communication unit 130, the memory 120, etc. through the bus 250.

The audio processor 140 includes hardware such as integrated circuitry that is configured to process audio data contained in contents received through the communication unit 130 or stored in the memory 120. The audio processor 140 may perform various types of processing for audio data such as decoding, amplification, noise filtering, and the like. The audio processor 140 may be coupled with the communication unit 130, the memory 120, etc. through the bus 250.

With continued reference to FIG. 1, when a suitable playback program for multimedia contents is executed, the control unit 200 may drive the video processor 135 and the audio processor 140 and thereby play such contents. At this time, the speaker unit 160 may output audio data created by the audio processor 140.

The user input unit 145 may receive various commands from a user. The user input unit 145 may include, but not be limited to, at least one of a key 146, a touch panel 147, and a pen recognition panel 148. It is also within the scope of the disclosure that the user input and display unit can be a single touch display.

The key 146 may include various types of keys, virtual keys or may be actual such as a mechanical button or a wheel, formed at certain places on the front, rear and lateral sides of the user device 100.

The touch panel 147 may detect a user's touch input and then output a touch event value corresponding to the detected touch input. In case the touch panel 147 is combined with the display panel 111 to form a touch screen, the touch screen may be realized using various types of touch sensors such as a capacitive type, a resistive type, or a piezoelectric type. The capacitive type uses dielectric material coated on the surface of the touch screen and calculates touch coordinates by sensing an electric current excited to a user's body when a user touches the surface of the touch screen. The resistive type uses two electrode plates embedded in the touch screen and calculates touch coordinates by sensing the flow of an electric current through contact between the plates at a touch point when a user touches the screen. A touch event occurring on the touch screen may be created in response to a user's finger or any other conductive object.

The pen recognition panel 148 may sense a touch or proximity input of a user's touch pen (e.g., a stylus pen or a digitizer pen) and thereby output a pen touch or proximity event. For example, the pen recognition panel 148 may be realized in the manner of EMR and sense a touch or proximity input depending on a variation in strength of an electromagnetic field caused by a touch or proximity of the pen. Specifically, the pen recognition panel 148 may be formed of an electromagnetic induction coil sensor (not shown) having a grid structure, and an electronic signal processor (not shown) sequentially offering an alternating current signal having a certain frequency to each loop coil of the electromagnetic induction coil sensor. If there is a pen having a resonance circuit around a loop coil of the pen recognition panel 148, a magnetic field transmitted from the loop coil will generate an electric current based on a mutual electromagnetic induction to the resonance circuit in the pen. Based on this generated electric current, an induction magnetic field is generated from a coil of the resonance circuit in the pen. Then, the pen recognition panel 148 detects this induction magnetic field from the loop coil being in a signal reception state, and thereby senses a touch or proximity location of the pen. The pen recognition panel 148 may have the area capable of covering a display region of the display panel 111 under the display panel 111.

The microphone unit 150 is configured to receive a user's voice or any other sound and then convert it into audio data. The control unit 200 may output a user's voice entered through the microphone unit 150 in a call process or store converted audio data pertaining to the voice in the memory 120.

The camera unit 155 is configured to take a still image or record a moving image according to a user's manipulation. The camera unit 155 may be formed of a front camera and a rear camera. In an embodiment for a user's eye tracking, the camera unit 155 may be used as way to receive a user's image.

In case the camera unit 155 and the microphone unit 150 are formed in the user device 100, the control unit 200 may perform a control operation in response to a user's voice entered through the microphone unit 150 or a user's motion recognized by the camera unit 155. Namely, the user device 100 may operate in a motion control mode or a voice control mode. In case of operating in a motion control mode, the control unit 200 activates the camera unit 155 to capture a user's image and track a user's motion, and performs a corresponding control operation. In case of operating in a voice control mode, the control unit 200 analyzes a user's voice entered through the microphone unit 150 and performs a control operation in response to the analyzed voice.

In the user device 100 that supports a motion control mode or a voice control mode, a voice recognition technology or a motion recognition technology may be used in the above-discussed various embodiments. For example, if a user takes a motion of selecting a certain object displayed on the home screen or says a voice command corresponding to the object, the user device 100 may determine that the object is selected, and then perform a control operation matched to the object.

The motion sensing unit 165 is configured to sense a motion of the user device 100 that may be rotated or tilted in various directions. The motion sensing unit 165 may sense motion features such as a rotation direction, angle or tilt by using various sensors such as a geomagnetic sensor, a gyro sensor, an acceleration sensor, and the like.

Although not shown in FIG. 1, the user device 100 may further include a USB port for a connection with a USB connector, various external input ports for connections with various external terminals such as a headset, a mouse, a LAN, etc., a Digital Multimedia Broadcasting (DMB) chip for receiving and processing DMB signals, various sensors, and the like, depending on embodiments.

In addition, the names of the above-discussed elements of the user device 100 may also be changed. Also, the user device 100 may be formed by inherently or optionally including at least one of the above-discussed elements and by additionally including any other element.

Figure 2:
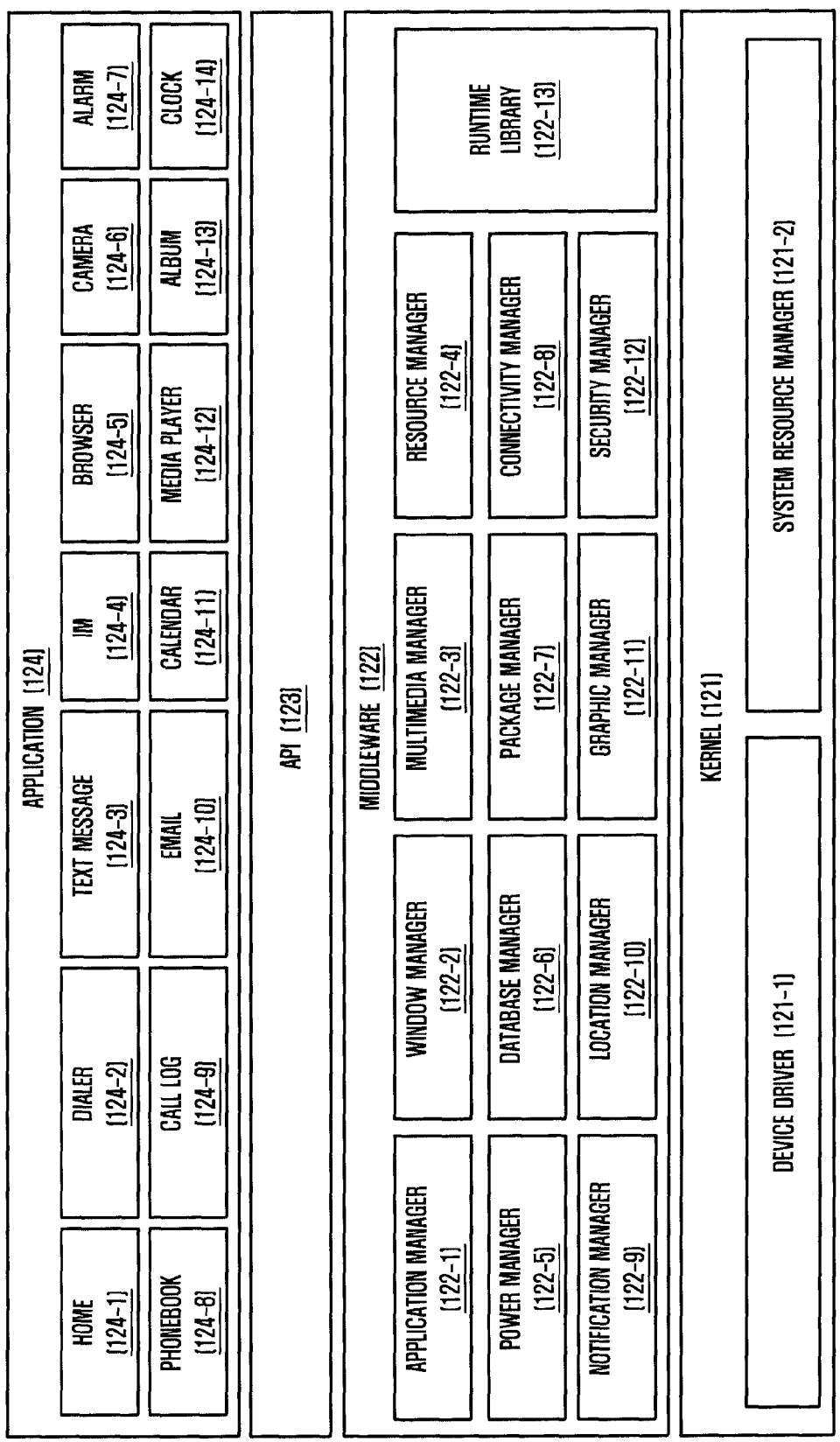
FIG. 2 is a block diagram illustrating the software configuration of a user device in accordance with an embodiment of the present disclosure.

FIG. 2 is a block diagram illustrating the code configuration of the user device 100 in accordance with an embodiment of the present disclosure.

Referring now to FIG. 2, the memory 120 may store therein an operating system (OS), programs, applications, and data. The OS is configured to control resources of the user device 100 and may include a kernel, a middleware, an Application Programming Interface (API), and the like. For example, Android, iOS, Windows, Symbian, Tizen, or Bada may be used as the OS.

The kernel 121 may include at least one of a device driver 121-1 or a system resource manager 121-2, which may manage resources. The device driver 121-1 may control hardware of the user device 100 by access with code. For example, the device driver 121-1 may be divided into an interface and an individual driver module offered by each hardware manufacturer. The device driver 121-1 may include, for example, at least one of a display driver, a camera driver, a Bluetooth driver, a shared memory driver, a USB driver, a keypad driver, a WiFi driver, an audio driver, or an Inter-Process Communication (IPC) driver. The system resource manager 121-2 may include a process manager, a memory manager, or a file system manager. The system resource manager 121-2 may perform a function to control, allocate, or recover system resources.

The middleware 122 may include a plurality of modules formed in advance to offer a function required in common for various applications. The middleware 122 may offer a necessary function through the API 123 such that the application 124 may effectively use resources of the user device 100 (e.g., a CPU 230, a GPU 240, etc.). The middleware 122 may include, for example, at least one of modules such as an application manager 122-1, a window manager 122-2, a multimedia manager 122-3, a resource manager 122-4, a power manager 122-5, a database manager 122-6, a package manager 122-7, a connectivity manager 122-8, a notification manager 122-9, a location manager 122-10, a graphic manager 122-11, or a security manager 122-12.

With continued reference to FIG. 2, the application manager 122-1 may manage a life cycle of the application 124. The window manager 122-2 may manage a GUI resource used in the screen. The multimedia manager 122-3 may realize the format required for playback of various media files and then, using a codec suitable for the format, perform encoding or decoding of the media file. The resource manager 122-4 may manage a resource such as a source code, a memory, or a storage space of the application 124. The power manager 122-5 may manage a battery or a power source by operating with BIOS or the like, and also offer power information required for operation. The database manager 122-6 may create, search or modify database to be used in the application 124. The package manager 122-7 may install or update the application 124 distributed in the form of a package file. The connectivity manager 122-8 may manage a wireless connection such as WiFi or Bluetooth. The notification manager 122-9 may display or notify any event such as an arrival message, a promise, or a proximity notification in a manner of not disturbing a user. The location manager 122-10 may manage location information of the user device 100. The graphic manager 122-11 may manage graphic effects, to be offered to a user, and associated user interfaces. The security manager 122-12 may offer any security function required for a system security or a user authentication. In case the user device 100 has a call function, the middleware 122 may further include a call manager (not shown) for managing a voice or video call function.

The middleware 122 may further include a runtime library 122-13 or other library modules (not shown). The runtime library 122-13 is a library module used by a compiler to add a new function through a programming language while any application is executed. For example, the runtime library 122-13 may perform a function of input/output, memory management, or arithmetical computation. The middleware 122 may create and use a new middleware module through various combinations of functions of the above-discussed internal element modules. Also, the middleware 122 may offer a specified module according to the type of the OS so as to provide a differentiated function. In addition, the middleware 122 may dynamically remove some of existing elements or add new elements. It is therefore possible to selectively omit any element disclosed herein, to add any other element, or to replace any element with another performing a similar function.

The API 123 is a set of API programming functions and may be offered as a different configuration according to the OS. In case of Android or iOS, a single API set may be provided for each platform. In case of Tizen, two or more API sets may be provided.

The application 124 may include a preloaded application installed as a default or a third party application arbitrarily installable by a user. The application 124 may include, for example, at least one of a home application 124-1 used for returning to the home screen, a dialer application 124-2 used for dialing a call, a text message application 124-3 (e.g., an SMS (Short Message Service) application or an MMS (Multimedia Message Service) application) used to receive a message from a sender device identified by a phone number, an IM (Instant Message) application 124-4, a browser application 124-5, a camera application 124-6, an alarm application 124-7, a phonebook application 124-8 used for managing phone numbers or addresses of opponent devices, a call log application 124-9 used for managing a call log, a received/transmitted message log, a missed call log, etc., an email application 124-10 used for receiving a message from a sender device identified by an email, a calendar application 124-11, a media player application 124-12, an album application 124-13, or a clock application 124-14. The name of each of the above-discussed software elements may be varied according to the type of the OS. Also, software disclosed herein may be formed of at least one of the above-discussed elements without some elements or with additional elements.

Figure 3:
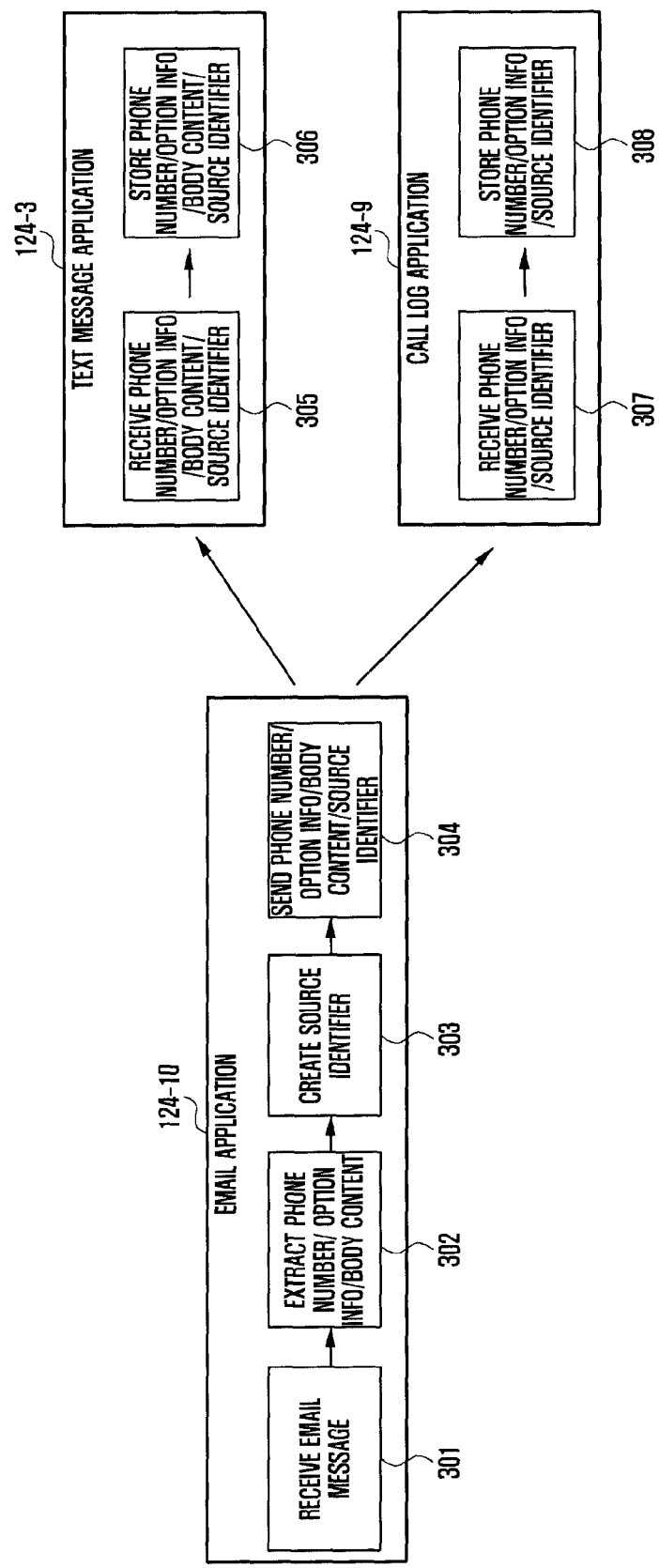
FIG. 3 is a block diagram illustrating a processing procedure of a control unit in a user device in accordance with an embodiment of the present disclosure.

FIG. 3 is a block diagram illustrating a processing procedure of the control unit 200 in the user device 100 in accordance with an embodiment of the present disclosure.

Referring now to FIG. 3, the control unit 200 may control the email application 124-10 to receive 301 an email message from any external device through the communication unit 130. In case the email application 124-10 receives 301 an email message, the user device 100 may be in "logged in" state with a mail server (not shown) that sends an email message. Login is a procedure in which a user accesses the mail server by using an ID and a password both of which are preregistered in the mail server. The mail server may require a login procedure whenever the user device 100 requests an email message, or may offer an email message without requiring again a login procedure during a certain time period once a login procedure is performed successively.

Meanwhile, if the user device 100 is not in a login state to the mail server, the user device 10 may display a popup message or screen requesting a login procedure when any email message is received. For example, a login screen may contain fields for entering an ID and a password to access the mail server.

After the reception of an email message is completed, the user device 100 may perform a logout procedure for disconnecting with the mail server. This logout procedure may be performed in response to a user's request or be automatically performed without a user's intervention when no email message is received for a predetermined time.

The control unit 200 may control the email application 124-10 to extract 302, from the received email message, at least one of a phone number, option information, and body content. For example, if the subject of an email message contains a phone number, the email application 124-10 may extract the phone number from the subject of the email message. If the body content of an email message contains a predefined phrase (e.g., a caller number) together with a phone number, the email application 124-10 may extract the phone number recorded near the phrase. If any email message has option information, the email application 124-10 may extract the option information. Such option information may be information that indicates at least one of urgency, reply requested, and importance about an email message. If no option information is contained in an email message, the email application 124-10 may extract option information from the body content or subject of the email message. Additionally, the control unit 200 may control the email application 124-10 to create 303 a source identifier which may contain a source identifier value that indicates a source of a phone number, a body content or option information. The creation 303 of a source identifier may be performed before the extraction of a phone number, option information, and body content.

Next, the control unit 200 may control the email application 124-10 to transmit 304 at least one of the extracted phone number, body content, option information and source identifier to both the text message application 124-3 and the call log application 124-9, which identifies a sender device by a phone number. Here, transmission of data from an application to other applications may be realized using the API offered by the OS.

The control unit 200 may control the text message application 124-3 to receive 305 at least one of a phone number, a body content, option information, and a source identifier from the email application 124-10. Also, the control unit 200 may control the call log application 124-9 to receive 307 at least one of a phone number, option information and source identifier from the email application 124-10. Based on a source identifier value, the text message application 124-3 and the call log application 124-9 may determine the source of the received phone number or message, and/or a call type of a received phone number, and/or a received/transmitted type of a message. For example, a source identifier value '1' may indicate the transmission of a call, and a source identifier value '2' may indicate the reception of a call. Also, a source identifier value '3' may indicate the transmission of a text message, a source identifier value '4' may indicate the reception of a text message, and a source identifier value '5' may indicate the transmission of a video. A source identifier value '8' may indicate the transmission of an email message, and a source identifier value '9' may indicate the reception of an email message.

With continued reference to FIG. 3, next, the control unit 200 may control the text message application 124-3 to store 306 at least one of a phone number, body content, option information, and source identifier in a predefined type. Also, the control unit 200 may control the call log application 124-9 to store 308 at least one of a phone number, option information and a source identifier in a predefined type. For example, the control unit 200 may control storing at least one of a phone number, body content, option information and source identifier in parts of the memory 120 based on a predefined type to be created, searched or modified by the text message application 124-3 or the call log application 124-9.

Figure 4:
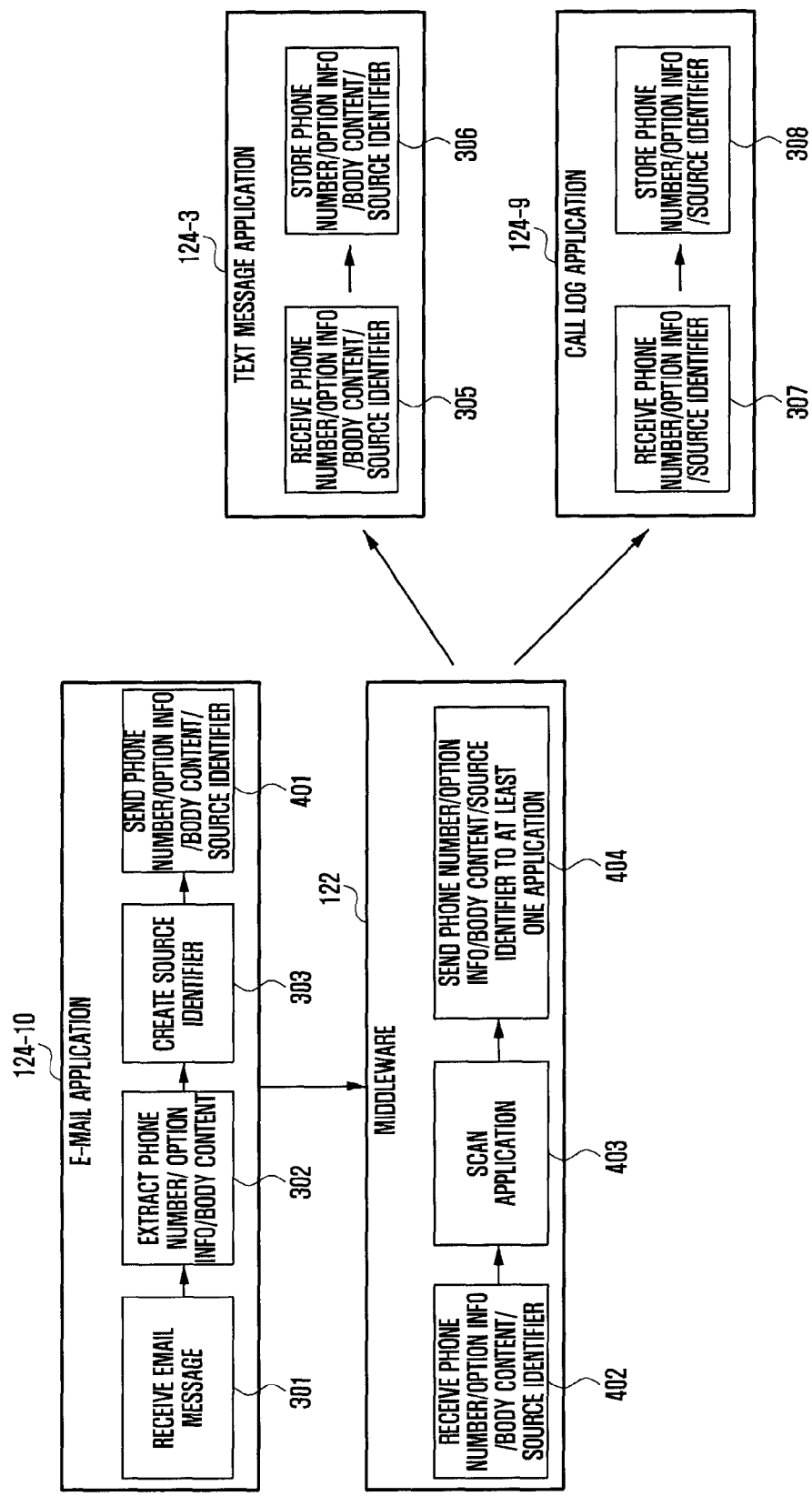
FIG. 4 is a block diagram illustrating a processing procedure of a control unit in a user device in accordance with another embodiment of the present disclosure.

FIG. 4 is a block diagram illustrating a processing procedure of the control unit 200 in the user device 100 in accordance with another embodiment of the present disclosure.

Referring now to FIG. 4, the control unit 200 may control the email application 124-10 to receive 301 an email message, to extract 302 at least one of a phone number, option information and body content from the received email message, and to create 303 a source identifier. Next, the control unit 200 may control the email application 124-10 to transmit 401 at least one of a phone number, body content, option information and source identifier to the middleware 122.

The middleware 122 may receive 402 at least one of a phone number, body content, option information and source identifier. Next, the middleware 122 may scan 403 an application that may receive at least one of a phone number, body content, option information or source identifier. For example, the middleware 122 may broadcast an attribute, length, etc. of data associated with at least one of a phone number, body content, option information and source identifier to respective applications installed in the user device 100. Then the middleware 122 may receive, from at least one application, a response signal that indicates the ability to receive at least one of a phone number, body content, option information and source identifier. For example, the middleware 122 may receive a response signal from the text message application 124-3 or the call log application 124-9. If the text message application 124-3 generates a response signal, the control unit 200 may control the middleware 122 to transmit 404 at least one of a phone number, body content, option information and source identifier to the text message application 124-3. Also, if the call log application 124-9 generates a response signal, the control unit 200 may control the middleware 122 to transmit 404 at least one of a phone number, option information and source identifier to the call log application 124-9.

The control unit 200 may control the text message application 124-3 to receive 305 at least one of a phone number, body content, option information, and source identifier from the middleware 122. Also, the control unit 200 may control the call log application 124-9 to receive 307 at least one of a phone number, option information and source identifier from the middleware 122. Next, the control unit 200 may control the text message application 124-3 to store 306 at least one of a phone number, body content, option information, and source identifier in a predefined category or type. Also, the control unit 200 may control the call log application 124-9 to store 308 at least one of a phone number, option information and source identifier in a predefined type.

Figure 5:
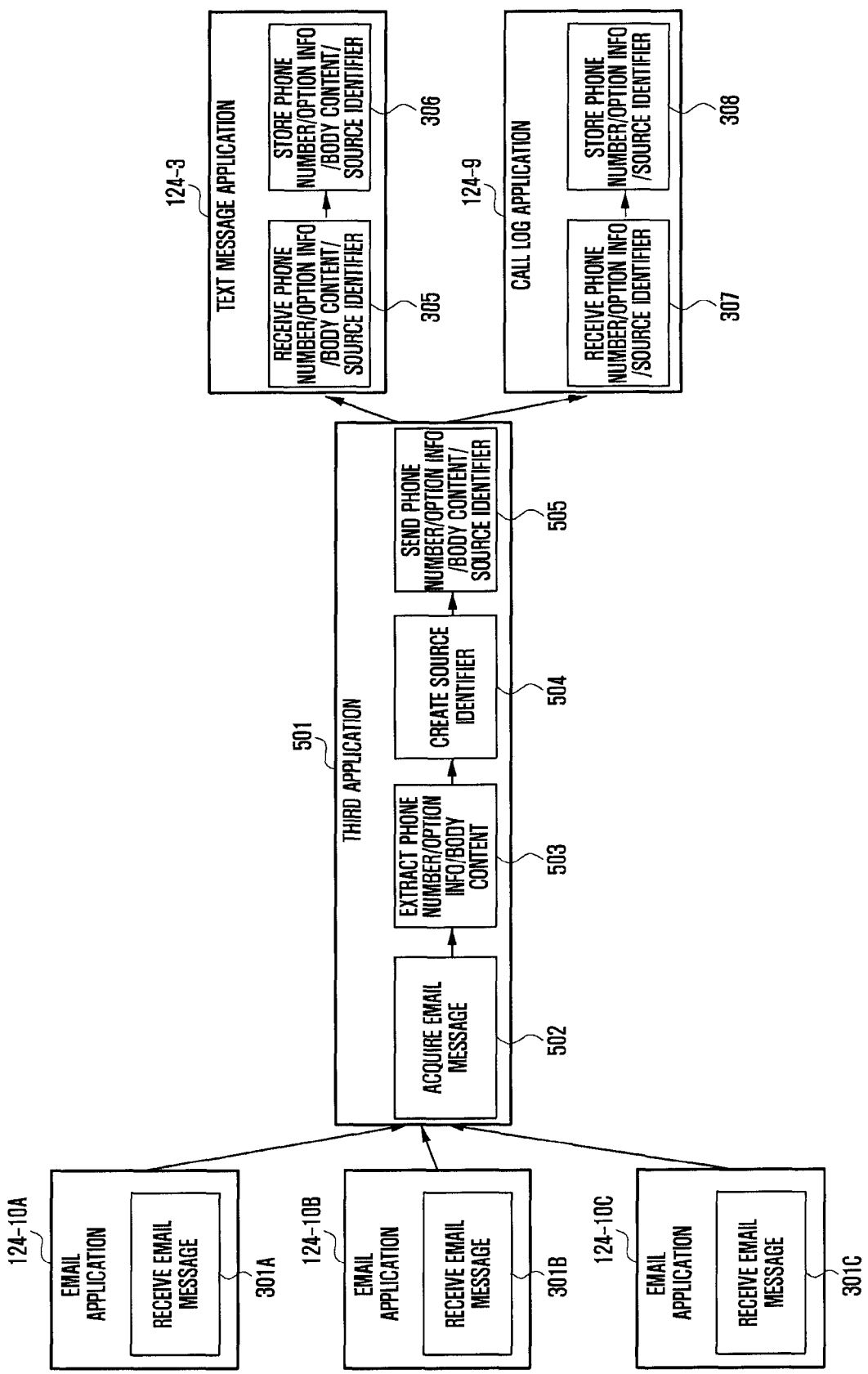
FIG. 5 is a block diagram illustrating a processing procedure of a control unit in a user device in accordance with still another embodiment of the present disclosure.

FIG. 5 is a block diagram illustrating a processing procedure of the control unit 200 in the user device 100 in accordance with still another embodiment of the present disclosure.

Referring now to FIG. 5, the control unit 200 may control email applications 124-10A, 124-10B and 124-10C to receive 301A, 301B and 301C email messages, respectively. Also, the control unit 200 may control the third application 501 to receive 502 email messages received by the email applications 124-10A, 124-10B and 124-10C. The third application 501, which is realized for operation in one embodiment of the present disclosure, may be an application that comprehensively manages information about email messages received from several types of email applications 124-10A, 124-10B and 124-10C to be delivered to a call application. Next, the control unit 200 may control the third application 501 to extract 503 at least one of a phone number, option information and body content from at least one of the received email messages, and to create 504 a source identifier. Here, the source identifier may have different source identifier values depending on types of the email applications 124-10A, 124-10B and 124-10C which are sources of the email messages. Next, the control unit 200 may control the third application 501 to transmit 505 at least one of a phone number, body content, option information and source identifier to the text message application 124-3 or the call log application 124-9.

Next, the control unit 200 may control the text message application 124-3 to receive 305 at least one of a phone number, a body content, option information, and a source identifier from the third application 501. Also, the control unit 200 may control the call log application 124-9 to receive 307 at least one of a phone number, option information and source identifier from the third application 501. Next, the control unit 200 may control the text message application 124-3 to store 306 at least one of a phone number, a body content, option information, and a source identifier in a predefined type. Also, the control unit 200 may control the call log application 124-9 to store 308 at least one of a phone number, option information and source identifier in a predefined type.

Figure 6:
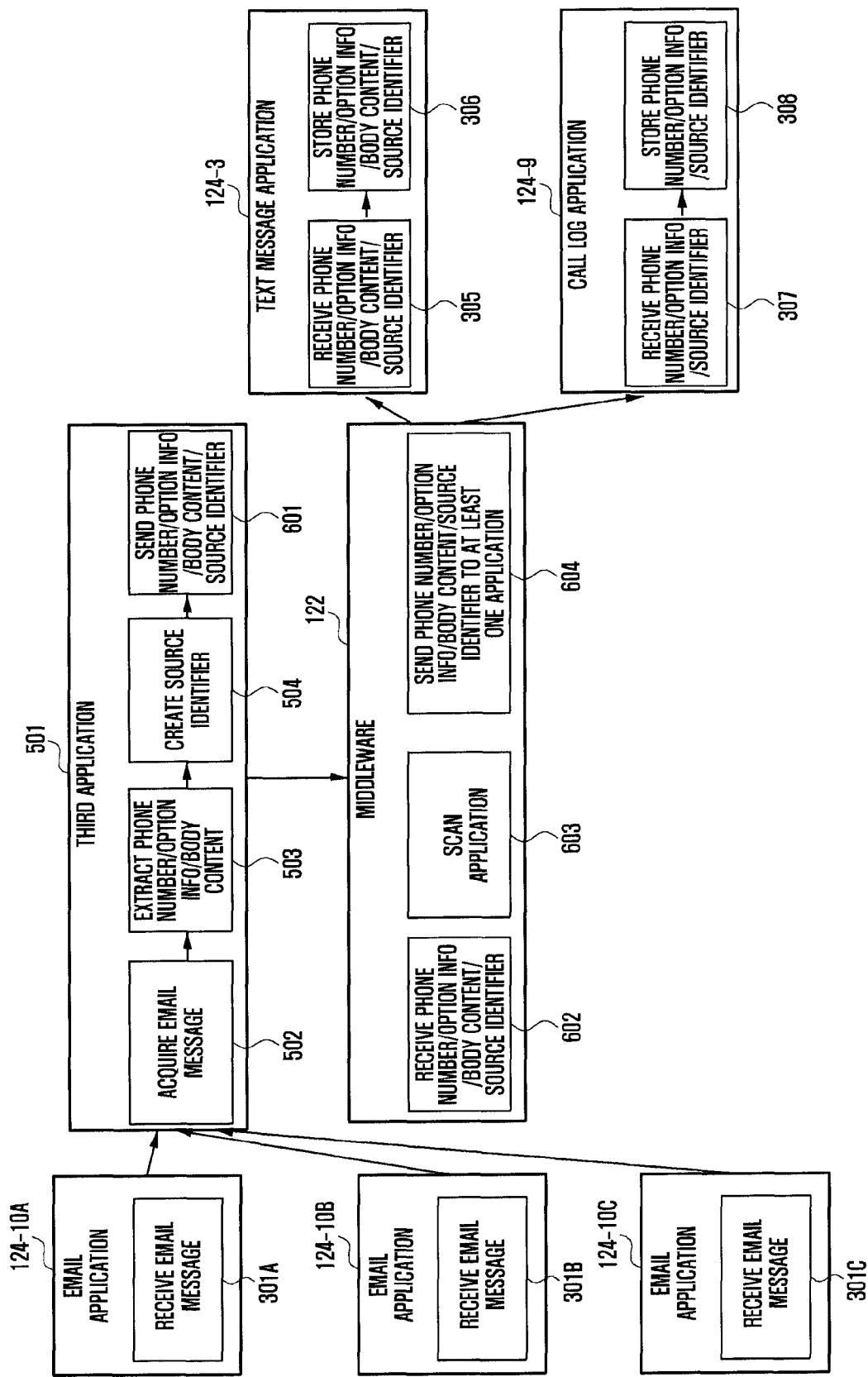
FIG. 6 is a block diagram illustrating a processing procedure of a control unit in a user device in accordance with yet another embodiment of the present disclosure.

FIG. 6 is a block diagram illustrating a processing procedure of the control unit 200 in the user device 100 in accordance with yet another embodiment of the present disclosure.

Referring now to FIG. 6, the control unit 200 may control email applications 124-10A, 124-10B and 124-10C to receive 301A, 301B and 301C email messages, respectively. Also, the control unit 200 may control the third application 501 to receive 502 email messages received by the email applications 124-10A, 124-10B and 124-10C. Next, the control unit 200 may control the third application 501 to extract 503 at least one of a phone number, an option information and a body content from at least one of the received email messages, and to create 504 a source identifier. Next, the control unit 200 may control the third application 501 to transmit 601 at least one of a phone number, a body content, an option information and a source identifier to the middleware 122.

Then the middleware 122 may receive 602 at least one of a phone number, a body content, an option information and a source identifier. Next, the middleware 122 may scan 603 an application that may receive at least one of a phone number, body content, option information and source identifier. As a result of scanning, if the text message application 124-3 generates a response signal, the control unit 200 may control the middleware 122 to transmit 604 at least one of a phone number, body content, option information and source identifier to the text message application 124-3. Also, if the call log application 124-9 generates a response signal, the control unit 200 may control the middleware 122 to transmit 604 at least one of a phone number, an option information and a source identifier to the call log application 124-9.

Next, the control unit 200 may control the text message application 124-3 to receive 305 at least one of a phone number, a body content, an option information, and a source identifier from the middleware 122. Also, the control unit 200 may control the call log application 124-9 to receive 307 at least one of a phone number, option information and source identifier from the middleware 122. Next, the control unit 200 may control the text message application 124-3 to store 306 at least one of a phone number, a body content, an option information, and a source identifier in a predefined type. Also, the control unit 200 may control the call log application 124-9 to store 308 at least one of a phone number, an option information and a source identifier in a predefined type.

Figure 7:
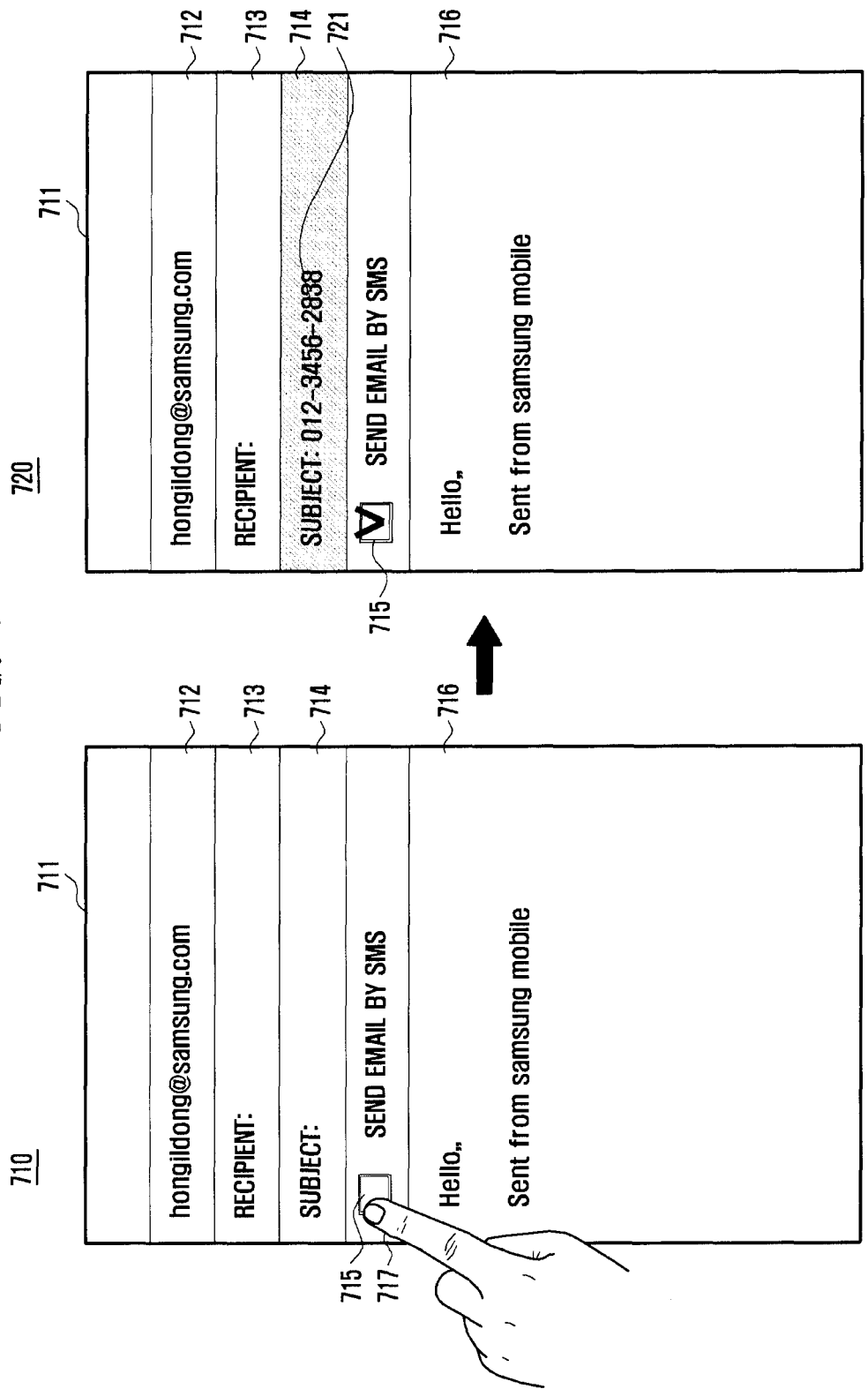
FIG. 7 shows screenshots illustrating a process of creating an email message in accordance with an embodiment of the present disclosure.

FIG. 7 shows screenshots illustrating a process of creating an email message in accordance with an embodiment of the present disclosure.

Referring now to a screenshot 710 in FIG. 7, the control unit 200 may control the display unit 110 to display thereon an execution screen, e.g., an email creation screen 711, of the email application 124-10. The email creation screen 711 may contain a sender's mail address input field 712, a recipient's mail address input field 713, and a subject field 714. Also, the email creation screen 711 may contain a check box 715 that selectively allows or disallows an email message to be delivered to a text message application of a sending device. And also, the email creation screen 711 may contain a body content field 716 in which text to be delivered to a recipient is written. A user may select 717 the check box 715 such that an email message may be delivered to the text message application 124-3 of a sending device.

Referring now to a screenshot 720 in FIG. 7, in response to a user's selection 717, the control unit 200 may control the display unit 110 to display a check mark in the check box 715 on the email creation screen 711. At this time, the control unit 200 may control the display unit 110 to inactivate (e.g., shade) the subject field 714. Also, the control unit 200 may control the display unit 110 to display a phone number 721 allocated to the user device 100 in the inactivated subject field 714. Alternatively, the control unit 200 may control the display unit 110 to display a keypad (not shown) to be used for a user to directly enter the phone number 721 in the subject field 714. Further, a user may write a subject as well as the phone number 721 in the subject field 714 by manipulating the displayed keypad.

Figure 8B:
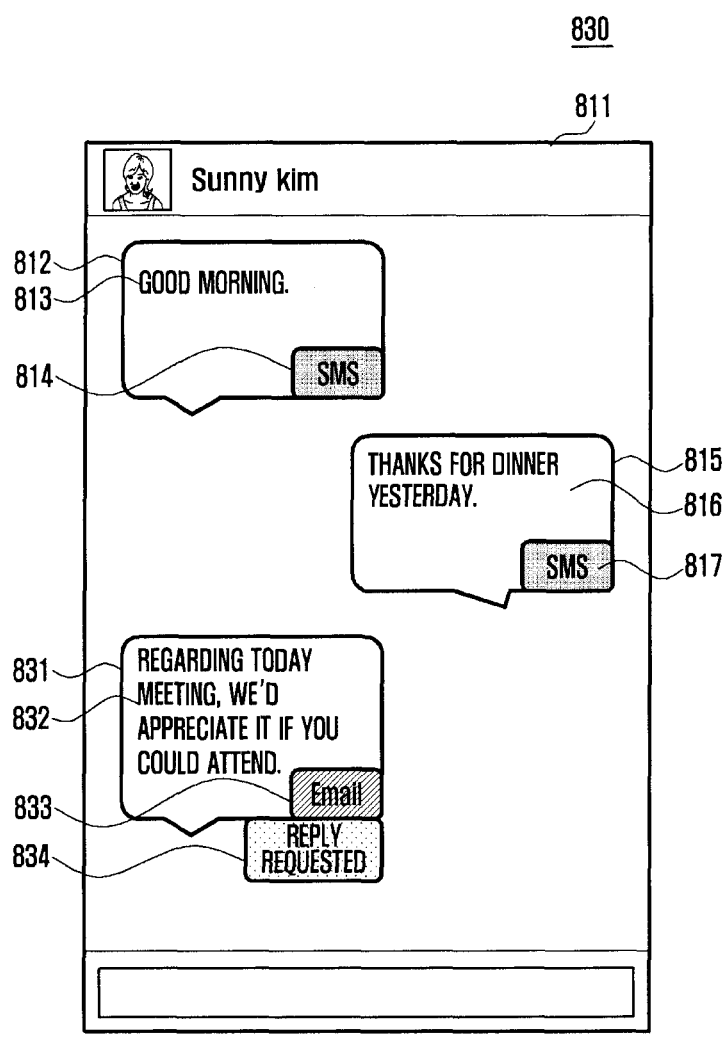

FIGS. 8A and 8B are screenshots illustrating a process of displaying an email message in a text message application in accordance with an embodiment of the present disclosure.

Referring to a screenshot 810 in FIG. 8A, the control unit 200 may control the display unit 110 to display thereon an execution screen, e.g., a message window 811, of the text message application 124-3. The message window 811 displays content 813 of a received text message and content 816 of a transmitted text message. The message window 811 may correspond to a phone number of a sending device. For example, the single message window 811 may appear in connection with a single phone number. Alternatively, in case a user invites two or more recipients in the single message window 811, the single message window 811 may display contents of several text messages received through phone numbers linked to such recipient devices.

The contents 813 and 816 of text messages may be displayed inside word bubbles 812 and 815. Also, source icons 814 and 817 which indicate that the contents 813 and 816 of text messages are received using the text message application 124-3 may be displayed inside the word bubbles 812 and 815. For example, the control unit 200 may control the display unit 110 to display, in the word bubbles 812 and 815, the source icons 814 and 817 'SMS' which indicate that the contents 813 and 816 of text messages are received using an SMS application as the text message application 124-3. The source icons 814 and 817 are not always displayed inside the word bubbles 812 and 815, and alternatively may be displayed near such contents 813 and 816 or around the word bubbles 812 and 815.

Referring to a screenshot 820 in FIG. 8A, in case the user device 100 receives an email message, the control unit 200 may control the display unit 110 to display, in the message window 811, a body content 822 of the email message received through the email application 124-10. The body content 822 of an email message may be displayed together with the contents 813 and 816 of text messages in the message window 811, and also may be contained inside a new word bubble 821. In this case, the control unit 200 may control the display unit 110 such that a source of the body content 822 of an email message may be visually distinguished from sources of the contents 813 and 816 of text messages. For example, in the word bubbles 812 and 815, the source icons 814 and 817 'SMS' which indicates that the contents 813 and 816 of text messages are received using an SMS application as the text message application 124-3 may be displayed. Also, in the word bubble 821, a source icon 823 'Email' which indicates that the body content 822 of an email message is received using the email application 124-10 may be displayed. The source icon 823 may be displayed in any other form than shown. For example, the source icon 823 may be displayed near the body content 822 or around the word bubble 821. Additionally, the word bubble 821 may be displayed to be visually distinguished from the word bubbles 812 and 815.

Referring now to a screenshot 830 in FIG. 8B, in case the user device 100 receives an email message, the control unit 200 may control the display unit 110 to display, in the message window 811, body content 832 of the email message, together with a source icon 833 thereof, received through the email application 124-10. In this case, an option icon 834 that indicates option information of an email message may be also displayed near the body content 832 of the email message or around a word bubble 831. The option icon 834 may be displayed in various forms depending on types of option information. For example, if option information of an email message contains any information which indicates that the body content 832 has a higher degree of urgency, the control unit 200 may control the display unit 110 to display an option icon 'Urgent' around the word bubble 831. If the option information contains any information which indicates a request for a reply to the body content 832, the control unit 200 may control the display unit 110 to display the option icon 834 'Reply Requested' around the word bubble 831. If option information contains any information which indicates that the body content 832 has higher importance, the control unit 200 may control the display unit 110 to display an option icon 'Important' around the word bubble 831. Besides, the color, a brightness and/or a size of the body content 832 and/or word bubble 831 may be varied according to the types of option information. Also, various visual effects such as animation or variable color may be applied to the body content 832 and/or the word bubble 831.

FIGS. 9 and 10 are screenshots illustrating a process of displaying an email message in a text message application in accordance with another embodiment of the present disclosure.

Referring now to a screenshot 910 in FIG. 9, the control unit 200 may control the display unit 110 to display, in a message window 911, a content of a text message received by the text message application 124-3, and the body content of an email message received by the email application 124-10. In this case, the control unit 200 may control the display unit 110 to further display an input field 912 for receiving a user's reply to contents displayed in the message window 911. A user may select 913 the input field 912.

Referring now to a screenshot 920 in FIG. 9, in response to the user's selection 913, the control unit 200 may control the display unit 110 to display an input window 921 for entry of text or contents, an 'SMS Send' button 923, and an 'Email Send' button 924. In this example, the user types a "mail confirmed" message and then has the option. A user may enter outgoing content 922 to be transmitted to a sender in the input window 921. After entry of the outgoing content 922, a user may select at least one of the 'SMS Send' button 923 or the 'Email Send' button 924 so as to deliver text or contents in the input window 921 to a sender. The 'SMS Send' button 923 is used to transmit the outgoing content 922 displayed in the input window 921 to a sending device through the text message application 124-3. The 'Email Send' button 924 is used to transmit the outgoing content 922 displayed in the input window 921 to a sending device through the email application 124-10. When a user select the 'Email Send' button 924, the control unit 200 may control the text message application 124-3 to receive the content 922 displayed in the input window 921 and also to transmit it to the email application 124-10. Then the email application 124-10 may transmit the received content 922 to a sender email application through a mail server. In this case, the control unit 200 may control the email application 124-10 to be executed in the background without being displayed on the screen. After the outgoing content 922 is transmitted, an email message containing the outgoing content 922 may be added to a sent item box of the email application 124-10. At this time, the subject of the email message in the sent item box may automatically contain a phone number of the recipient.

Referring now to a screenshot 1010 in FIG. 10, the control unit 200 may control the display unit 110 to display outgoing content in the message window 911. In case a user selects the 'SMS Send' button 923, outgoing content 1012 sent to the recipient may be displayed in the message window 911. This outgoing content 1012 may be contained in a word bubble 1011, and also a source icon 1013 which indicates that the outgoing content 1012 is sent through the text message application 124-3 may be displayed near the outgoing content 1012. For example, the source icon 1013 may be displayed in or around the word bubble 1011 or near the outgoing content 1012.

Referring now to a screenshot 1020 in FIG. 10, in case a user selects the 'Email Send' button 924, outgoing content 1022 sent to the recipient may be displayed in the message window 911. This outgoing content 1022 may be contained in a word bubble 1021, and also a source icon 1023 "email" in this example, which indicates that the outgoing content 1022 is sent through the email application 124-10 may be displayed near the outgoing content 1022. For example, the source icon 1023 may be displayed in or around the word bubble 1021 or near the outgoing content 1022.

Figure 11A:
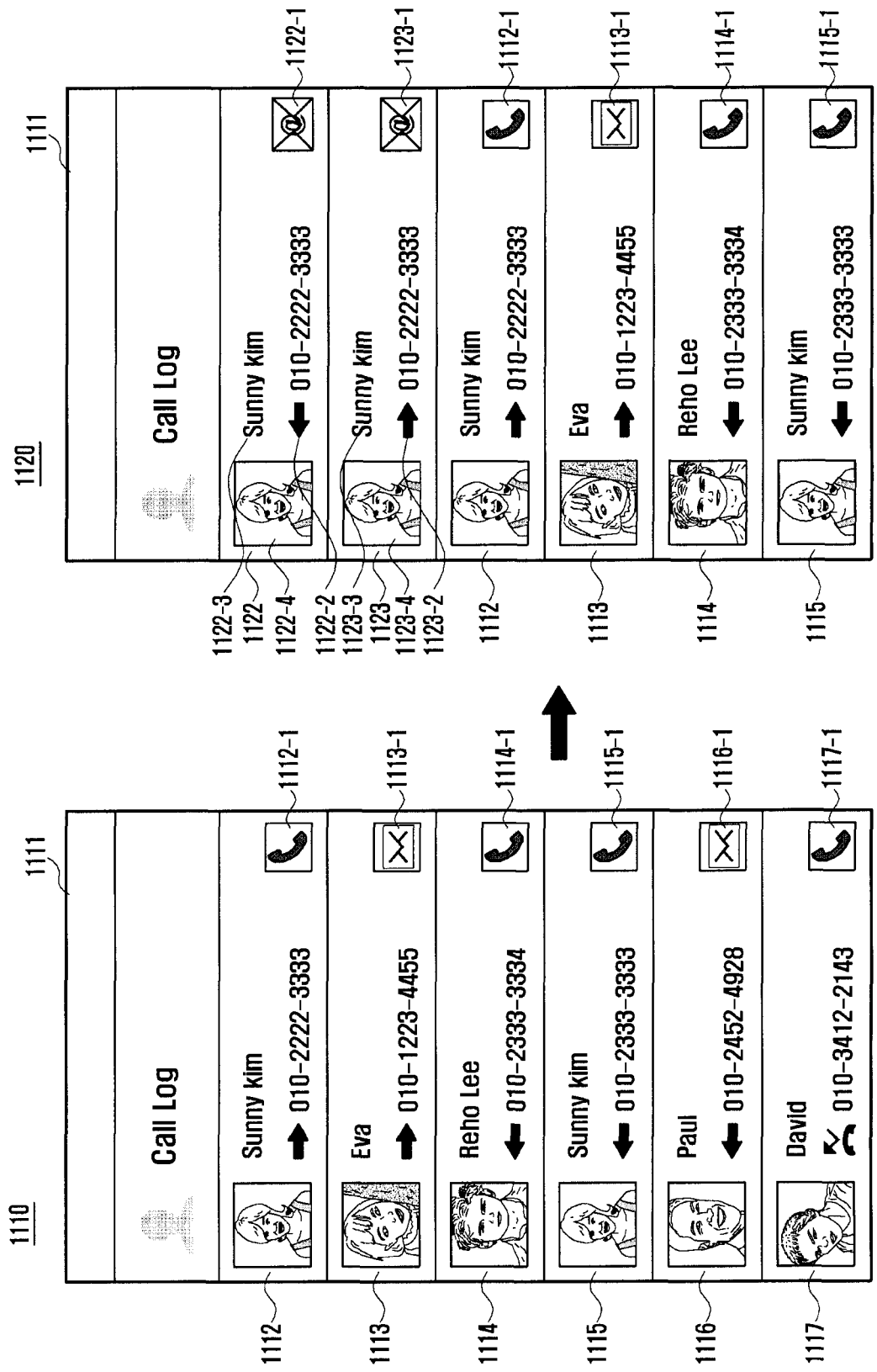
FIG. 11A and FIG. 11B are screenshots illustrating a process of displaying an email message in a call log application in accordance with an embodiment of the present disclosure.
Figure 11B:
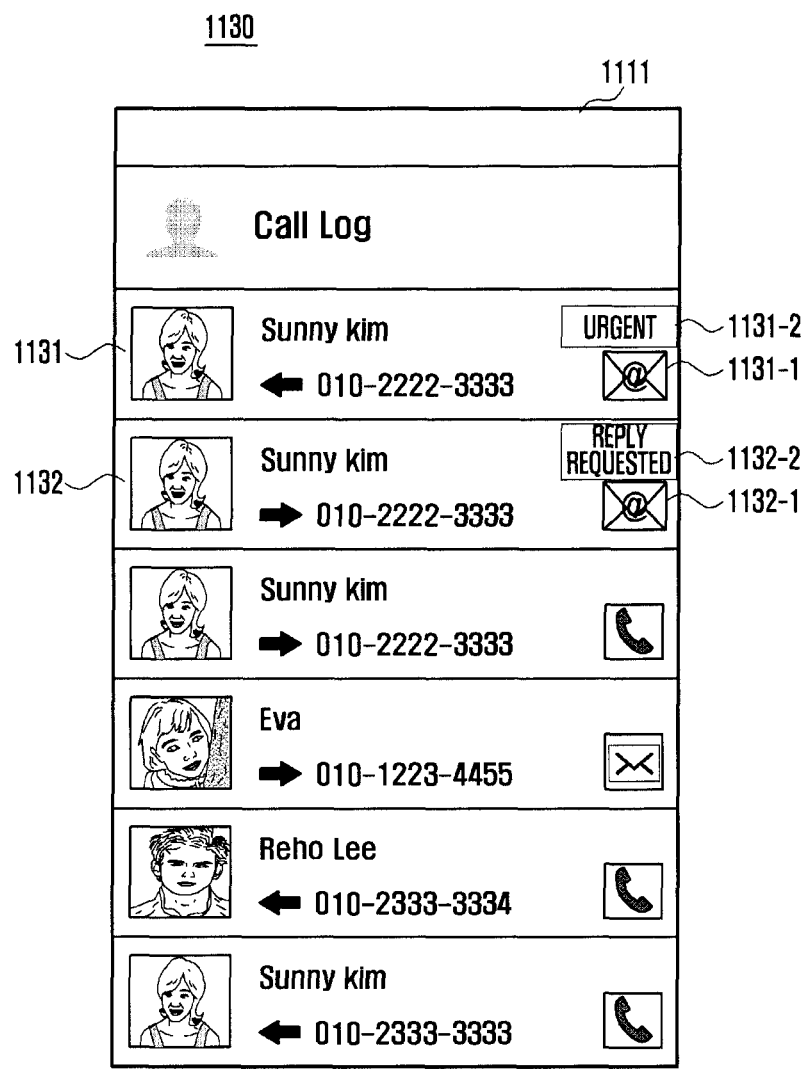

FIGS. 11A and 11B are screenshots illustrating a process of displaying an email message in a call log application in accordance with an embodiment of the present disclosure.

Referring now to a screenshot 1110 in FIG. 11A, the control unit 200 may control the display unit 110 to display at least one of a received/sent call log, a received/sent message log, or a missed call log in an execution screen, e.g., a call log screen 1111, of the call log application 124-9. For example, a call log list containing therein at least one of received call logs 1114 and 1115, a sent call log 1112, a missed call log 1117, a sent message log 1113, and a received message log 1116 may be displayed in the call log screen 1111. Further, source icons indicating the sources of respective logs may be displayed in the call log screen 1111. For example, the source icons 1112-1, 1114-1, 1115-1 and 1117-1 having a shape of  may be displayed at the call logs 1112, 1114 and 1115 and the missed call log 1117 which are generated in response to the execution of the dialer application 124-2. Also, the source icons 1113-1 and 1116-1 having a shape of  may be displayed at the message logs 1113 and 1116 which are generated in response to the execution of the text message application 124-3. Icons of this type let a user know at a glance what type of log is displayed, and based on the arrows, for example, can determining if it is an incoming or outgoing call log, message, missed call log, etc.

Referring to a screenshot 1120 in FIG. 11A, in case an email message is received or sent, the control unit 200 may control the display unit 110 to display a received or sent email message log in the call log screen 1111. For example, a call log list containing therein a received email message log 1122 and a sent email message log 1123 as well as received/sent call logs 1112, 1114 and 1115 and a received/sent text message log 1113 may be displayed in the call log screen 1111. Further, source icons indicating the sources of the received/sent email message logs 1122 and 1123 may be displayed in the call log screen 1111. For example, the email message logs 1122 and 1123 generated in response to the execution of the email application 124-10 may have the source icons 1122-1 and 1123-1 having a shape of . Also, received/sent-type icons 1122-2 and 1123-2 each of which indicates a received or sent email message log may be displayed at the email message logs 1122 and 1123. For example, a received-type icon 1122-2 having a shape of  may be displayed at the received email message log 1122, and a sent-type icon 1123-2 having a shape of  may be displayed at the sent email message log 1123. Also, the name, nickname, or image of a sender linked to a phone number may be displayed at each email message log 1122 or 1123. For example, if the subject of any email message corresponding to the email message log 1122 or 1123 contains a phone number, the control unit 200 may search the database of the phonebook application 124-8 to find a sender's name corresponding to the phone number. Then the control unit 200 may control the display unit 110 to display sender's names 1122-3 and/or 1123-3 or sender's images 1122-4 and 1123-4 corresponding to found phone numbers at the email message logs 1122 and 1123.

Referring now to a screenshot 1130 in FIG. 11B, option icons 1131-2 and 1132-2 indicating option information of email messages corresponding to email messages 1131 and 1132 may be displayed in the call log screen 1111. For example, if an email message corresponding to the email message log 1131 has a higher degree of urgency, an option icon 'Urgent' 1131-2 may be displayed at the email message log 1131. If a sender requests a reply to an email message corresponding to the email message log 1132, an option icon 'Reply Requested' 1132-2 may be displayed at the email message log 1132. Besides, various visual effects such as changes in color, size, brightness, flashing the background or the foreground, etc. and/or font may be applied to the email message logs 1131 and 1132 and/or the source icons 1131-1 and 1132-1 according to types of option information.

Figure 12:
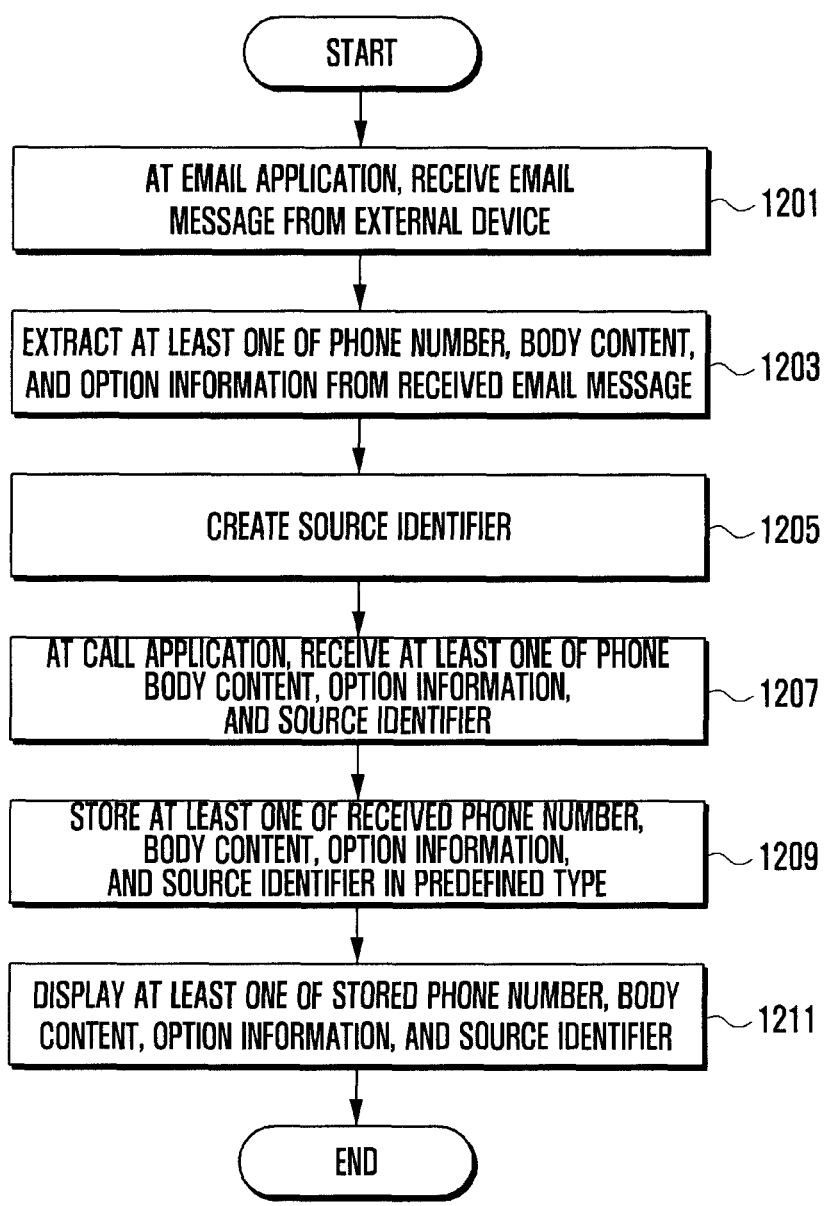
FIG. 12 is a flow diagram illustrating a method for managing an email message in accordance with an embodiment of the present disclosure.

FIG. 12 is a flow diagram illustrating a method for managing an email message in accordance with an embodiment of the present disclosure.

Referring now to FIG. 12, at operation 1201, the email application 124-10 installed in the user device 100 may receive (i.e. receive) an email message from an external device (e.g., receive an email message from an external device through the communication unit 130). At operation 1203, the email application 124-10 may extract at least one of a phone number, body content, and option information from the received email message. Then, at operation 1205, the email application 124-10 may create a source identifier that indicates a source of the extracted phone number, a body content and/or optional information. This source identifier may be created by the middleware 122 or the application 124. At operation 1207, the call application installed in the user device 100 may receive at least one of a phone number, body content, option information, and a source identifier. For example, the text message application 124-3 may receive one or more of a phone number, a body content, an option information, and a source identifier. Then, at operation 1209, the call application may store at least one of the received phone number, body content, option information, and source identifier in a predefined type. Additionally, at operation 1211, the call application may display, on the screen, at least one of the stored phone number, body content, option information, and source identifier.

Figure 13:
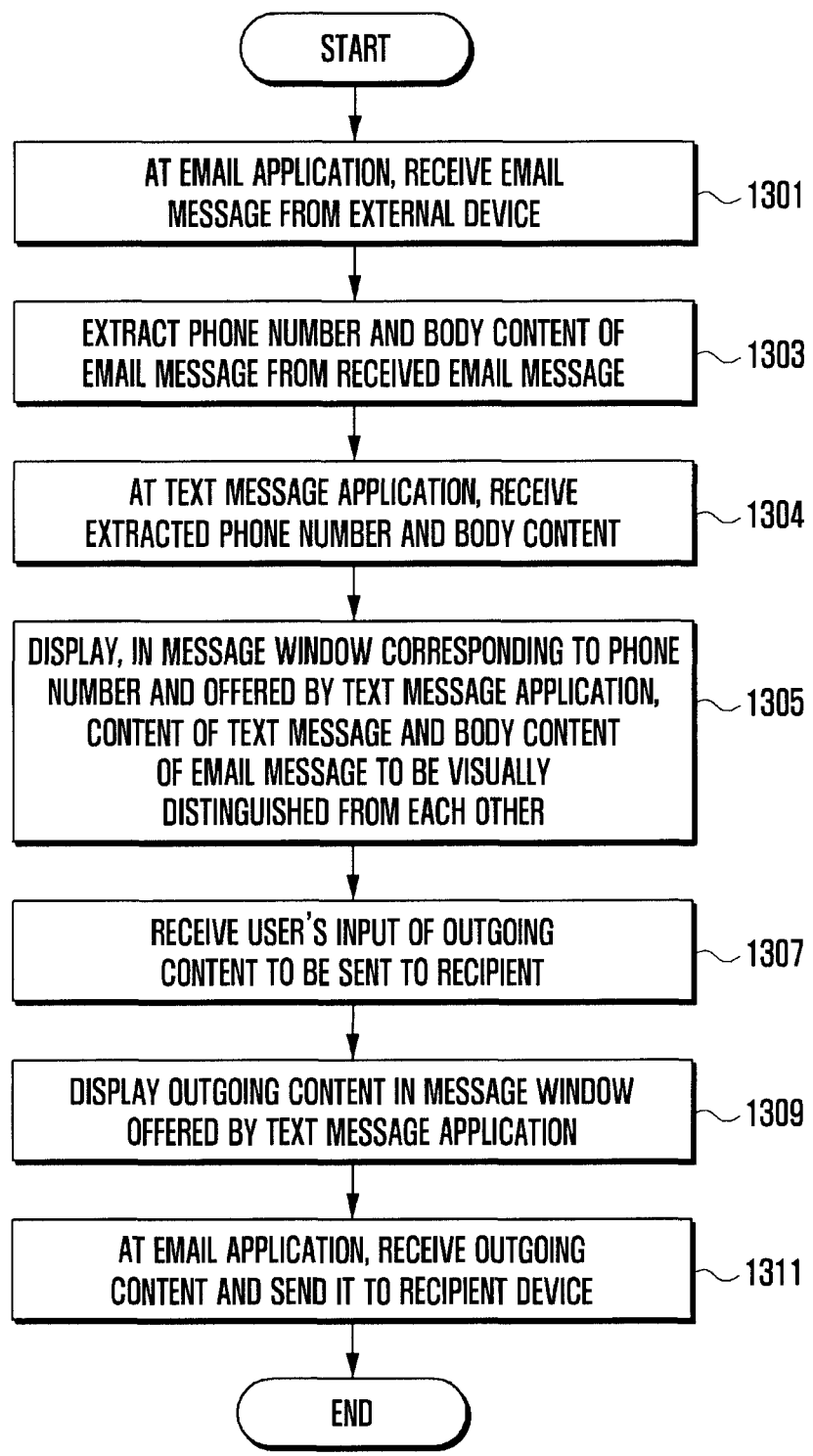
FIG. 13 is a flow diagram illustrating a method for managing an email message in accordance with another embodiment of the present disclosure.

FIG. 13 is a flow diagram illustrating a method for managing an email message in accordance with another embodiment of the present disclosure.

Referring to FIG. 13, at operation 1301, the email application 124-10 installed in the user device 100 may receive an email message from an external device. At operation 1303, the email application 124-10 may extract a phone number and body content from the received email message. Then, at operation 1304, the text message application 124-3 installed in the user device 100 then receives the extracted phone number and body content of an email message extracted by the email application. Also, at operation 1305, the text message application 124-3 may display, in a message window corresponding to the extracted phone number, the content of a text message received through the phone number, and the body content of the email message. At this time, the content of the text message and the body content of the email message in the message window may be displayed so as to be visually distinguished from each other. Next, at operation 1307, the text message application 124-3 may receive a user's input of outgoing content to be transmitted to a recipient. This outgoing content may be delivered from the text message application 124-3 to the email application 124-10. At operation 1309, the text message application 124-3 may display the outgoing content in the message window before or after the delivery of the outgoing content to the email application 124-10. At operation 1311, the email application 124-10 may receive the outgoing content and then transmit it to a recipient device.

Figure 14:
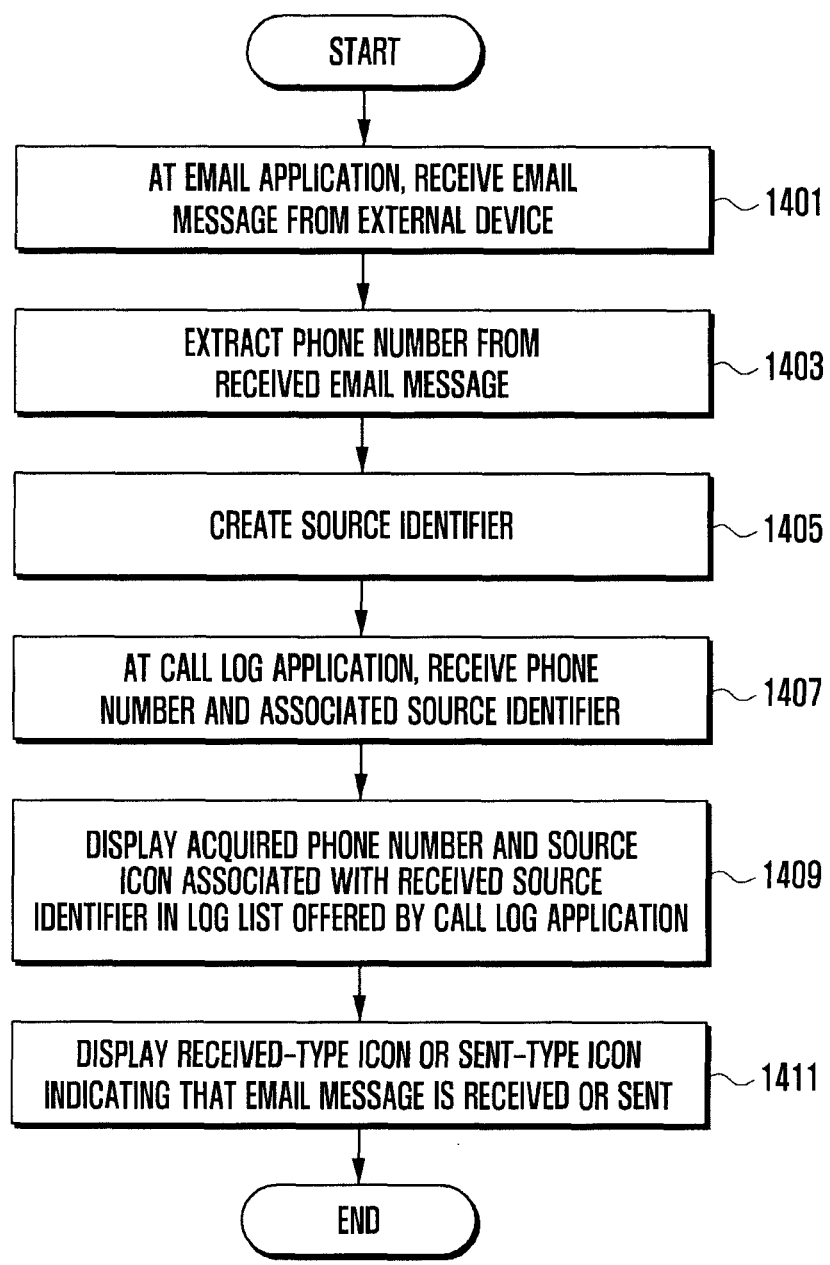
FIG. 14 is a flow diagram illustrating a method for managing an email message in accordance with still another embodiment of the present disclosure.

FIG. 14 is a flow diagram illustrating a method for managing an email message in accordance with still another embodiment of the present disclosure.

Referring now to FIG. 14, at operation 1401, the email application 124-10 installed in the user device 100 may receive an email message from an external device. At operation 1403, the email application 124-10 may extract a phone number from the received email message. Also, at operation 1405, the email application 124-10 may create an associated source identifier indicating the source of the extracted phone number. This associated source identifier may be created by the middleware 122 or the application 124. At operation 1407, the call log application 124-9 installed in the user device 100 may receive the phone number and the associated source identifier. Then, at operation 1409, the call log application 124-3 may display, in a log list, the received phone number and a source icon associated with the associated source identifier. Before or after or simultaneously with operation 1409, the call log application 124-3 may display at operation 1411 a received-type icon indicating a received email message and/or a sent-type icon indicating a sent email message.

Figure 15:
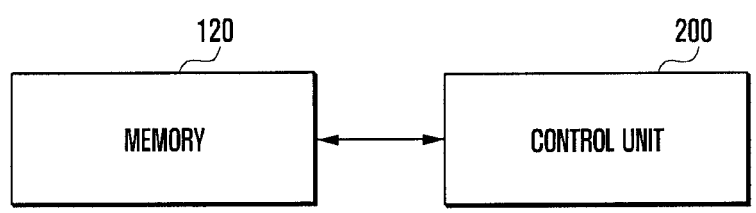
FIG. 15 is a block diagram illustrating a user device in accordance with another embodiment of the present disclosure.

FIG. 15 is a block diagram illustrating a user device 100 in accordance with another embodiment of the present disclosure.

Referring now to FIG. 15, the user device 100 includes the memory 120 and the control unit 200. Hereinafter, the repetition of the same as described above will be avoided.

The memory 120 may store therein various programs and data required for the operation of the user device 100. For example, the memory 120 may store therein the email application 124-10, the text message application 124-3, the call log application 124-9, and the like.

The control unit 200 may control the email application 124-10 to receive an email message from a mail server (not shown) located at the outside of the user device 100. Also, the control unit 200 may control the text message application 124-3 or the call log application 124-9 to receive a phone number extracted from the email message and to receive an associated source identifier indicating that the phone number is extracted from the email message. Next, the control unit 200 may control the memory 120 to store therein the received phone number and the associated source identifier in a predefined type.

Figure 16:
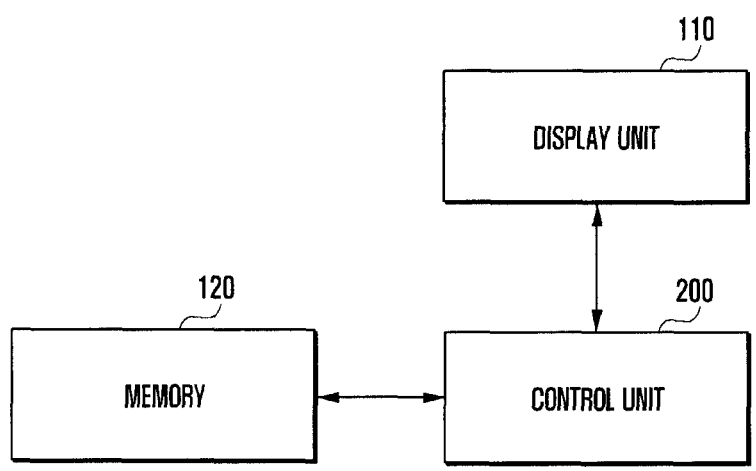
FIG. 16 is a block diagram illustrating a user device in accordance with still another embodiment of the present disclosure.

FIG. 16 is a block diagram illustrating a user device 100 in accordance with still another embodiment of the present disclosure.

Referring to FIG. 16, the user device 100 includes the display unit 110, the memory 120, and the control unit 200. Hereinafter, the repetition of the same as described above will be avoided.

The memory 120 may store therein various programs and data required for the operation of the user device 100. For example, the memory 120 may store therein the email application 124-10, the text message application 124-3, the call log application 124-9, and the like.

The control unit 200 may control the email application 124-10 to receive an email message from a mail server (not shown) located at the outside of the user device 100. Also, the control unit 200 may control the text message application 124-3 or the call log application 124-9 to receive a phone number extracted from the email message and an associated source identifier indicating that the phone number is extracted from the email message. Next, the control unit 200 may control the display unit 110 to display thereon the received phone number and source identifier. For example, the control unit 200 may control the display unit 110 to display the body content of the email message in a message window which corresponds to the received phone number and is offered by the text message application 124-3. Alternatively or additionally, the control unit 200 may control the display unit 110 to display the received phone number and a source icon associated with the associated source identifier in a log list offered by the call log application 124-9.

Figure 17:
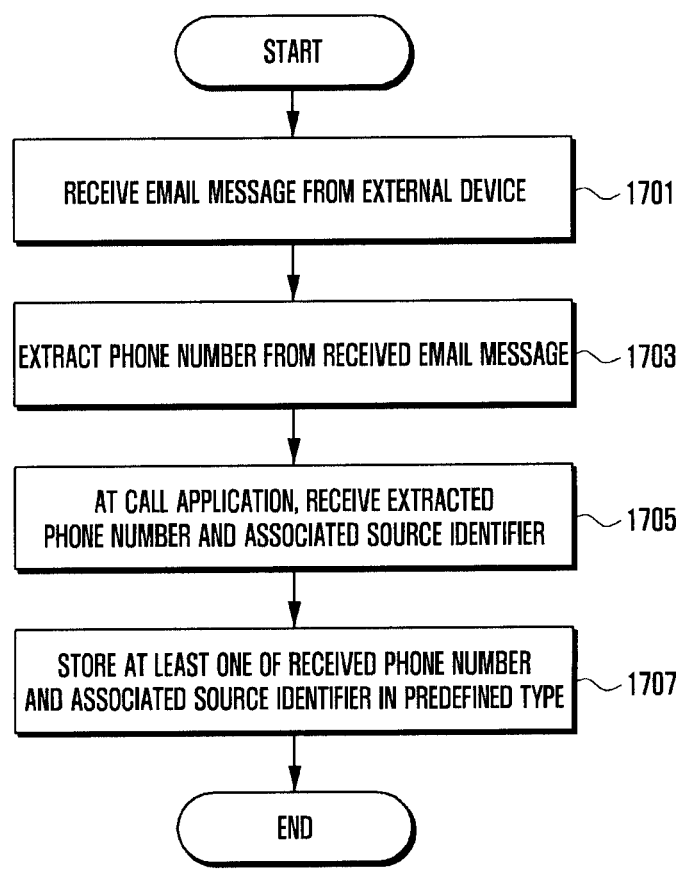
FIG. 17 is a flow diagram illustrating a method for managing an email message in accordance with yet another embodiment of the present disclosure.

FIG. 17 is a flow diagram illustrating a method for managing an email message in accordance with yet another embodiment of the present disclosure.

Referring to FIG. 17, at operation 1701, the user device 100 may receive an email message from an external device. Then, at operation 1703, the user device 100 may extract a phone number from the received email message. Next, at operation 1705, the call application installed in the user device 100 may receive the extracted phone number and a source identifier indicating that the received phone number is extracted from the email message. Also, at operation 1707, the user device 100 may store at least one of the received phone number and an associated source identifier in a predefined type.

Figure 18:
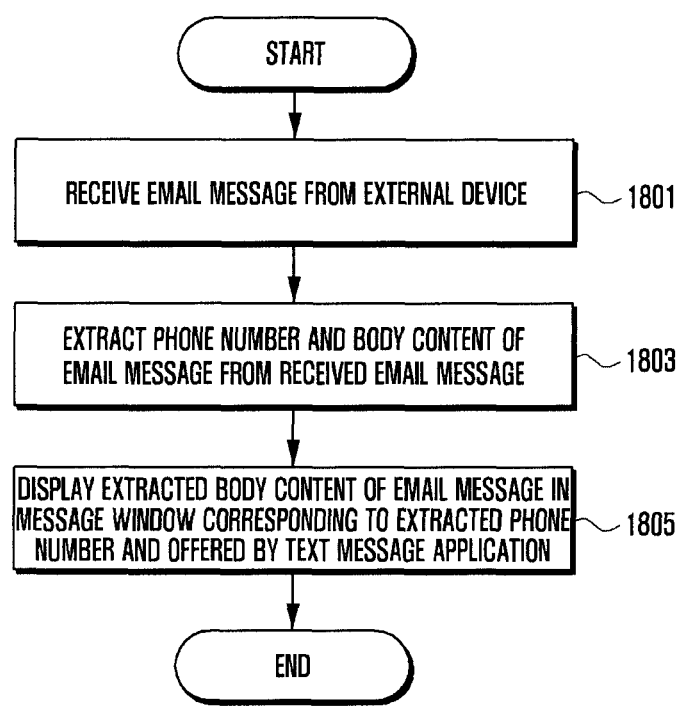
FIG. 18 is a flow diagram illustrating a method for managing an email message in accordance with a further another embodiment of the present disclosure.

FIG. 18 is a flow diagram illustrating a method for managing an email message in accordance with further another embodiment of the present disclosure.

Referring to FIG. 18, at operation 1801, the user device 100 may receive an email message from an external device. Then, at operation 1803, the user device 100 may extract a phone number and body content from the received email message. Also, at operation 1805, the user device 100 may display the extracted body content in a message window which corresponds to the extracted phone number and is offered by the text message application 124-3.

Figure 19:
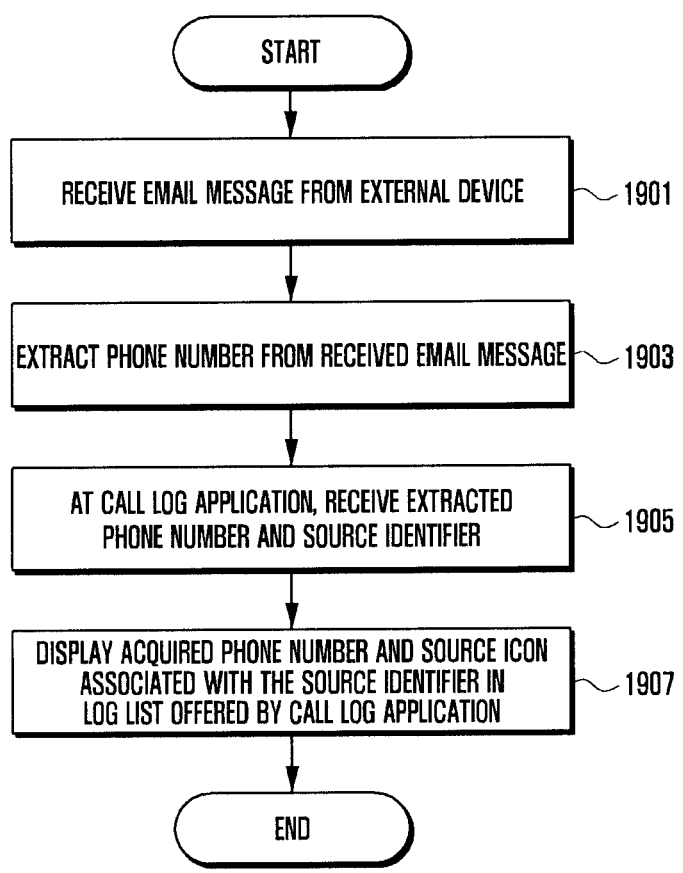
FIG. 19 is a flow diagram illustrating a method for managing an email message in accordance with a still further another embodiment of the present disclosure.

FIG. 19 is a flow diagram illustrating a method for managing an email message in accordance with still further another embodiment of the present disclosure.

Referring to FIG. 19, at operation 1901, the user device 100 may receive an email message from an external device. Then, at operation 1903, the user device 100 may extract a phone number from the received email message. At operation 1905, the call log application 124-9 installed in the user device 100 may receive the extracted phone number and an associated source identifier indicating that the received phone number is extracted from the email message. Also, at operation 1907, the user device 100 may display the received phone number and a source icon associated with the source identifier in a log list offered by the call log application 124-3.

According to various embodiments discussed hereinbefore, since an email message is managed using a call application, it is possible to comprehensively manage a text message and an email message. Also, since a user is allowed to easily check an email message using a call application, user's accessibility to an email message may be improved. And also, even though a user is placed in a difficult situation to receive a call or a text message, he or she may simply check a received email message through a call application.

The above-described methods according to the present invention can be implemented in hardware, or loaded into hardware such as a processor controller, or that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller, or the programmable hardware contain circuitry that may be integrated, and can include memory components, e.g., RAM, ROM, Flash, etc. that may store or receive computer code that when accessed and executed by the computer, processor or hardware implement the processing methods described herein. In addition, it would be recognized that when a general purpose computer accesses code for implementing the processing shown herein, via the execution of the code transforms the general purpose computer into a special purpose computer for executing the processing shown herein. In addition, an artisan understands and appreciates that a "controller", "processor" or "microprocessor" constitute hardware in the claimed invention and include integrated circuitry. Under the broadest reasonable interpretation, the appended claims constitute statutory subject matter in compliance with 35 U.S.C. §101 and none of the elements constitute software per se. Nor is the invention a mere abstract idea.

The terms "unit" or "module" as may be used herein is to be understood as constituting or operating in conjunction with hardware such as a circuit, integrated circuit, processor or microprocessor configured for a certain desired functionality in accordance with statutory subject matter under 35 U.S.C. §101, and such terms do not constitute software per se.

In addition, the above-discussed method is described herein with reference to flowchart illustrations of user interfaces, methods, and computer program products according to embodiments of the present disclosure. It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While the present disclosure has been particularly shown and described with reference to an exemplary embodiment thereof, it will be understood by those skilled in the art that various changes in form and details may be made therein without departing from the spirit and scope of the present disclosure as defined by the appended claims.

What is claimed is:

1. A method for managing email messages in a user device using a call application that identifies a sending device by a phone number, the method comprising:
   receiving an email message from an external device;
   extracting by the user device, a phone number and a body content of the email message from the received email message;
   generating a source identifier indicating that the phone number is extracted from the email message;
   receiving, by a text message application of the user device, the extracted phone number, the body content of the email message and the generated source identifier, the text message application is comprised in the call application;
   displaying, by the text message application, the body content of the email message with a source icon associated with the generated source identifier;
   receiving, by the text message application, a user's input of outgoing content to be transmitted to the external device and a user's selection for transmitting the outgoing content through one of the text message application and an email message application; and
   displaying, by the text message application, the outgoing content with a source icon indicating that the outgoing content is sent through the one of the text message application and the email message application.

2. The method of claim 1, further comprising:
   storing the received phone number, the generated source identifier and the received body content of the email message in the predefined category in storage.

3. The method of claim 1, wherein the call application further comprises a call log application.

4. The method of claim 1, further comprising:
extracting by the email application from the received email message an option information of the email message;
receiving by the text message application the extracted option information of the received email message; and
storing the received option information of the email message in the predefined category in storage,
wherein the option information includes an indication of at least one of an urgency of the email message, an importance of the email message, and a request for a reply to the email message.

5. The method of claim 1, wherein extracting the phone number from the received email message is performed by one of the call application, an email application installed in the user device, or a middleware of the user device.

6. The method of claim 1, wherein the displaying the body content of the email message with the source icon associated with the generated source identifier comprises
displaying the body content of the email message in a message window which corresponds to the extracted phone number, wherein the body content is communicated by a text message application installed in the user device.

7. The method of claim 6, further comprising:
displaying in the message window a content of a text message, received by the text message application, wherein the content of the text message displayed in the message window is visually distinguished from the body content of the email message.

8. The method of claim 1, further comprising:
if the user's selection is for transmitting the outgoing content through the email message application, acquiring, at an email application installed in the user device, the outgoing content and then transmitting the received outgoing content to the external device.

9. A user device for managing an email message through a call application that identifies a sending device by a phone number, the user device comprising:
a display unit;
a memory configured to store therein an email application and a call application; and
a control unit configured to:
control the email application to receive the email message from an external device,
control the text message application to receive the phone number and a body content of the email message extracted from the email message and to generate a source identifier indicating that the phone number is extracted from the email message, the text message application is comprised in the call application, control the display unit to display the body content of the email message with a source icon associated with the generated source identifier, control the text message application to receive a user's input of outgoing content to be transmitted to the external device and a user's selection for transmitting the outgoing content through one of the text message application and the email message application, and control the display unit to display the outgoing content with a source icon indicating that the outgoing content is sent through the one of the text message application and the email message application.

10. The user device of claim 9, wherein the control unit is further configured to:
control the memory to store the received phone number, the generated source identifier and the received body content of the email message in a predefined category in storage.

11. The user device of claim 9, wherein the call application further comprises a call log application.

12. The user device of claim 9, wherein the control unit is further configured to:
control the text message application to receive option information of the email message, and
control the memory to store therein the received option information of the email message in the predefined category, and
wherein the option information includes at least one of an indication of: an urgency of the email message, an importance of the email message, and a request for a reply to the email message.

13. The user device of claim 9, wherein the control unit is configured to
control the display unit to display the body content of the email message in a message window which corresponds to the phone number and is offered by the text message application.

14. The user device of claim 13, wherein the control unit is further configured to control the display unit to display in the message window a content of a text message, received by the text message application, and
wherein the content of the text message displayed in the message window is visually distinguished from the body content of the email message.

15. The user device of claim 9, wherein the control unit is further configured to:
control the email application to receive the outgoing content and to transmit the received outgoing content to the recipient's device, if the user's selection if for transmitting the outgoing content through the email message application.

16. A non-transitory computer-readable medium recording thereon a program for managing an email message through a call application which is installed in a user device and identifies a sending device by a phone number, the program configured to define control commands for:
receiving the email message from an external device;
extracting a phone number and a body content of the email message from the received email message;
generating a source identifier indicating that the phone number is extracted from the email message;
receiving, by a text message application of the user device, the extracted phone number, the body content of the email message and the generated source identifier, the text message application is comprised in the call application;
displaying, by the text message application, the body content of the email message with a source icon associated with the generated source identifier;
receiving, by the text message application, a user's input of outgoing content to be transmitted to the external device and a user's selection for transmitting the outgoing content through one of the text message application and an email message application; and
displaying, by the text message application, the outgoing content with a source icon indicating that the outgoing content is sent through the one of the text message application and the email message application.

* * * * *